United States Patent [19]
Ikeda et al.

[11] Patent Number: 6,008,910
[45] Date of Patent: Dec. 28, 1999

[54] FILM IMAGE READING APPARATUS AND METHOD IN WHICH MULTIPLE IMAGES ARE SIMULTANEOUSLY DISPLAYED

[75] Inventors: Takahiro Ikeda, Tokyo; Masashi Tazawa, Kanagawa-ken; Toshiya Aikawa, Kanagawa-ken; Nobuhiro Fujinawa, Kanagawa-ken; Yoshiyuki Takeda, Kanagawa-ken, all of Japan

[73] Assignee: Nikon Corporation, Tokyo, Japan

[21] Appl. No.: 08/882,099

[22] Filed: Jun. 25, 1997

[30] Foreign Application Priority Data

Jun. 25, 1996 [JP] Japan ................................. 8-164446
Apr. 1, 1997 [JP] Japan ................................. 9-082969

[51] Int. Cl.⁶ .................................................. H04N 1/036
[52] U.S. Cl. .......................................... 358/487; 358/527
[58] Field of Search ................................. 358/487, 527; 348/96–97; 386/46

[56] References Cited

U.S. PATENT DOCUMENTS

| | | | |
|---|---|---|---|
| 4,482,924 | 11/1984 | Brownstein | 358/302 |
| 4,633,306 | 12/1986 | Utsugi | 358/102 |
| 4,974,096 | 11/1990 | Wash | 358/302 |
| 5,541,644 | 7/1996 | Nanba | 348/96 |
| 5,752,114 | 5/1998 | Saito et al. | 396/429 |
| 5,768,444 | 6/1998 | Nishimura | 382/298 |

*Primary Examiner*—Thomas D Lee
*Assistant Examiner*—Stephen Brinich
*Attorney, Agent, or Firm*—Oliff & Berridge, PLC

[57] ABSTRACT

A film image reading apparatus reads the image of a strip film and can generate index display screen data to be displayed on a monitor screen of a host apparatus with the contents arbitrarily selected and set by the user. The film image reading apparatus also includes a memory to store index display setting screen data to be displayed on the monitor screen of the host apparatus and an display data generator which takes an output from an image reader and from a magnetic information reader which are entered from the host apparatus according to setting data selected and set on the index display setting screen, and which generates index display screen data to be displayed on the monitor screen of the host apparatus.

31 Claims, 34 Drawing Sheets

FILM INFORMATION AUTOMATIC SETTING FIELD

- FILM TYPE : COLOR NEGATIVE
- FILM MODEL : COMPANY A XXX4000
- TOTAL NUMBER OF FRAMES : 40

Figure 6

FILM INFORMATION MANUAL SETTING FIELD

- FILM TYPE : COLOR NEGATIVE
- FILM MODEL : COMPANY A XXX4000
- TOTAL NUMBER OF FRAMES : 40

| O K | CANCEL |

Figure 7

◎ DISPLAY MAGNETIC INFORMATION ONLY
◎ DISPLAY IMAGE ONLY

1. COMMON CHOICE
   1 - 1. FRAMES TO BE DISPLAYED
      ◎ ALL FRAMES
      ◎ ALL FRAMES THAT HAVE BEEN SHOT
      ◎ H SIZE ONLY
      ◎ C SIZE ONLY
      ◎ P SIZE ONLY
      ◎ HORIZONTAL POSITION ONLY
      ◎ VERTICAL POSITION ONLY
      ◎ SELECTION FRAME (FROM FRAME TABLE)

| FRAME TABLE | | | | | | | | | |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |

FRAMES SELECTED 1, 2, 3, 4, 5, 6, 7, • • • •

1 - 2. ORDER OF DISPLAY
      ◎ FROM FIRST TO LAST FRAME
      ◎ FROM LAST TO FIRST FRAME
      ◎ IN ORDER OF SELECTION FROM FRAME TABLE
      ◎ IN ORDER OF PRINT SIZE
         1. [H]    2. [C]    3. [P]
      ◎ IN ORDER OF TITLE
   1 - 3. VERTICAL TO HORIZONTAL RATIO OF DISPLAY
      VERTICAL : [FRAMES]    HORIZONTAL : [FRAMES]

Figure 8

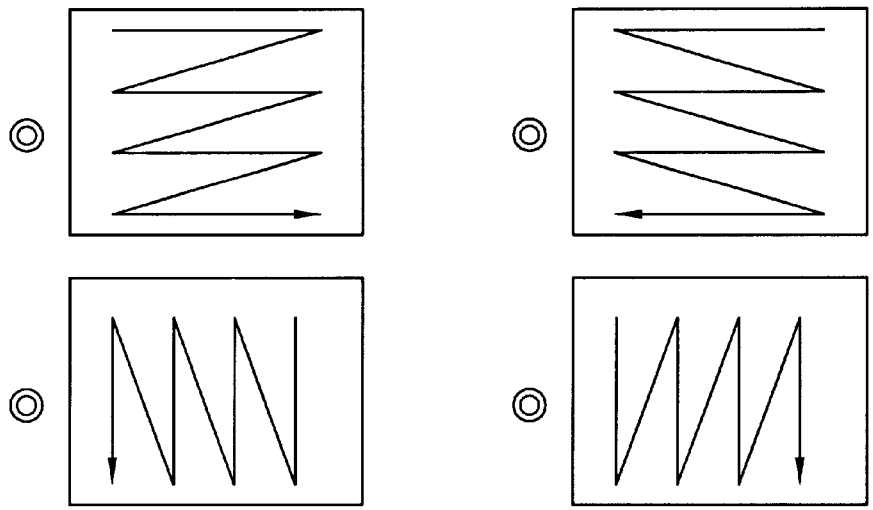
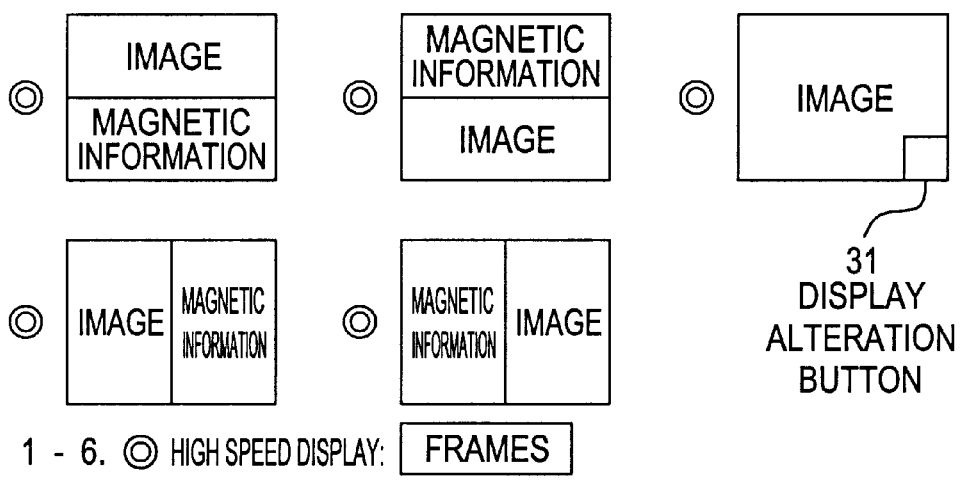
Figure 9

2. DESIGNATED FRAME INFORMATION

2 - 1. DISPLAY INFORMATION

◎ DISPLAY ALL    ◎ 

3. DESIGNATED FRAME IMAGE

3 - 1. DISPLAY RANGE

◎ ALL   ◎ DESIGNATED PRINT SIZE

◎ H SIZE   ◎ C SIZE   ◎ P SIZE

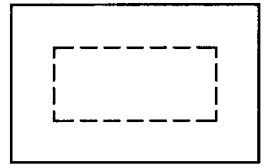
    X1 : [ ] pixel
    Y1 : [ ] pixel
    X2 : [ ] pixel
    Y2 : [ ] pixel 3 - 2. RESOLUTION PER FRAME : [ ] dpi

3 - 3. READING METHOD

◎ HIGH SPEED READING  ◎ HIGH QUALITY READING

3 - 4. COLOR DECOMPOSITION

◎ RGB DECOMPOSITION  ◎ CMY DECOMPOSITION
       DISPLAY              DISPLAY

[ O K ]   [ CANCEL ]   [ INITIAL SETTING ]

MAGNETIC INFORMATION

TITLE : ATHLETIC FIELD DAY
DATE SHOT : OCTOBER 10, 1996
SHOOTING CONDITIONS : STROBE ON
REVERSED LIGHT
LIGHT SOURCE : FLUORESCENT LIGHT

IMAGE

MAGNETIC INFORMATION

TITLE : ATHLETIC FIELD DAY
DATE SHOT : OCTOBER 10, 1996
SHOOTING CONDITIONS : STROBE ON
REVERSED LIGHT
LIGHT SOURCE : FLUORESCENT LIGHT

FILM IMAGE READING APPARATUS AND METHOD IN WHICH MULTIPLE IMAGES ARE SIMULTANEOUSLY DISPLAYED

BACKGROUND OF THE INVENTION

1. Field of Invention

The present invention relates to a film image reading apparatus which reads an image of a strip of film.

2. Description of Related Art

A film image reading apparatus which reads the image of the film shot by a camera is known as a film scanner. Film scanners are used to read an image of a negative film or a reverse film and to input the image data into host apparatus such as a personal computer.

Such film image reading apparatus are divided into transmission type reading apparatus—in which light transmitted through the film medium is given to the image reading means, such as, e.g., a CCD, (hereafter "line sensor")—and into reflection type reading apparatus in which light reflected from the film medium is given to the line sensor. The line sensor and the film medium are related such that either the film medium is made to move relative to the line sensor or the line sensor is made to move relative to the film medium.

Conventionally, the line sensor is formed of an image accumulation unit which is a plurality of photo-electric conversion units arranged in a row, and a transfer unit to transfer electric charge accumulated in each of the image accumulation units. In the line sensor, transferring the electric charge accumulated in each of the image accumulation units to the transfer unit and scanning the electric charge to the external apparatus is executed sequentially from one end of the film image to the other end in the length direction. This image reading scanning is defined as main scanning and the direction of this scanning is defined as main scanning direction.

An image in the image region of the film is read by moving the film medium relative to the line sensor by the moving means in the subscanning direction, which is perpendicular to the main scanning direction.

Further, a more recent type of standard film is also available. This film is a strip of film (hereafter "roll film") to which magnetic information may be added and which may be handled without being taken out of the cartridge even after development of the film.

For example, this roll film comprises a magnetic memory unit (or portion) in the lead unit and in each frame. Film information is stored in the magnetic memory unit of the lead unit. A title, a shooting date, shooting conditions and the like are written in the magnetic memory unit of each frame.

The film information includes a type and model of the film, frame number, total number of frames and the like. The type of the film indicates whether the film is color or black and white, and whether the film is positive or negative, and so on.

In a film image reading apparatus which handles roll film, index display image data is generated which enables one-glance observation of each frame of the roll film. This index display image data is sent to a host apparatus and is index-displayed in a monitor screen. Moreover, an index print of the index-displayed image data may be obtained.

However, in a camera which handles a roll film, a high vision size (H size), a classic size (C size) and a panorama size (P size) may be selected, for example, for the size of the shooting image.

Shooting conditions may also be stored in the magnetic memory unit of each frame. Thus, a user can enjoy taking pictures by arbitrarily setting shooting conditions in a camera designed to handle the roll film. Therefore, it is desirable to have an index display with user designable features.

SUMMARY OF THE INVENTION

Film image reading apparatus according to embodiments of the invention can make the display data which is displayed in the monitor screen of the host apparatus generate contents which are arbitrarily selected and set by the user.

Film image reading apparatus according to embodiments of the invention include an illumination means to illuminate long film medium in which a magnetic memory unit is provided for each image memory region of each frame, an image reading means to output image signals by photo-electric converting and scanning, in the main scanning direction, the light being input through each image memory region of the film medium, a moving means to move at least one of the film medium and the image reading means in subscanning direction which is perpendicular to the main scanning direction, a magnetic information reading means to read magnetic information which is stored in the magnetic memory unit, and a display data generation means to take-in the output from the image reading means and the magnetic information reading means based on setting data which has been selected and set in the index display setting screen to generate data in the index display screen that is displayed in the monitor screen of the host apparatus.

The data of the index display setting screen may include data which causes the apparatus to determine whether or not one or both of magnetic information and image of all the frames is displayed.

The data of the index display setting screen may include data which causes the apparatus to determine whether or not one or both of magnetic information and image of the designated frame is displayed.

The film image reading apparatus includes data of the index display setting screen which may include data which causes the apparatus to select the frame to be displayed.

The film image reading apparatus may also include data of the index display setting screen that includes data which causes the apparatus to select the order of display such as whether the frames to be displayed are displayed in frame number ascending order.

The film image reading apparatus may also include data of the index display setting screen that includes data which causes the apparatus to select ratio of length to width of the screen to be displayed.

The film image reading apparatus may also include data of the index display setting screen that includes data which causes the apparatus to select a display method to determine how the frame to be displayed is arranged in the monitor screen.

The film image reading apparatus may also include data of the index display setting screen that includes data which causes the apparatus to select a display method to determine how the magnetic information and the image are arranged in the monitor screen when both the magnetic information and the image are displayed.

The film image reading apparatus may also include data of the index display setting screen that includes data which causes the apparatus to determine whether only the specified frame number established is displayed first.

The film image reading apparatus may also include data of the index display setting screen that includes data which causes the apparatus to designate the range of the image to be displayed.

The film image reading apparatus may also include data of the index display setting screen that includes data which causes the apparatus to designate the resolution of the image to be displayed.

The film image reading apparatus may also include data of the index display setting screen that includes data which causes the apparatus to select a reading method to determine a high speed image reading or high quality reading.

The film image reading apparatus may also include data of the index display setting screen that includes data which causes the apparatus to select a color decomposition display of the image.

An index display setting screen data which is stored by the memory is sent to the host apparatus and the index display setting screen is displayed in the monitor screen. As a result, setting the index display screen is executed on the monitor screen of the host apparatus and the setting data is input in the film image reading apparatus. Moreover, the display data generation means accepts the output from the image reading means and the magnetic information reading means, which is input from the host apparatus, according to the setting data selected and set in the index display setting screen.

Various types of data are included in the index display setting screen data as described in the detailed description of the film image reading apparatus.

According to the invention, the index display screen which the user arbitrarily selects and sets is easily displayed in the monitor screen of the host apparatus.

BRIEF DESCRIPTION OF THE DRAWINGS

FIG. 6 is a drawing describing an example of a film information automatic setting screen display.

FIG. 7 is a drawing describing an example of a film information manual setting screen display.

FIG. 8 is a drawing describing an example of a first index display setting screen display.

FIG. 9 is a drawing describing an example of a second index display setting screen display.

FIG. 10 is a drawing describing an example of a third index display setting screen display.

FIG. 30 is an enlarged diagram describing an example frame of a magnetic information only index display screen.

FIG. 32 is an enlarged diagram describing an example frame of a magnetic information and image index display screen.

DETAILED DESCRIPTION OF PREFERRED EMBODIMENTS

Hereafter, the configuration of the embodiments of the present invention will be described with reference to the drawings.

Figure 1:
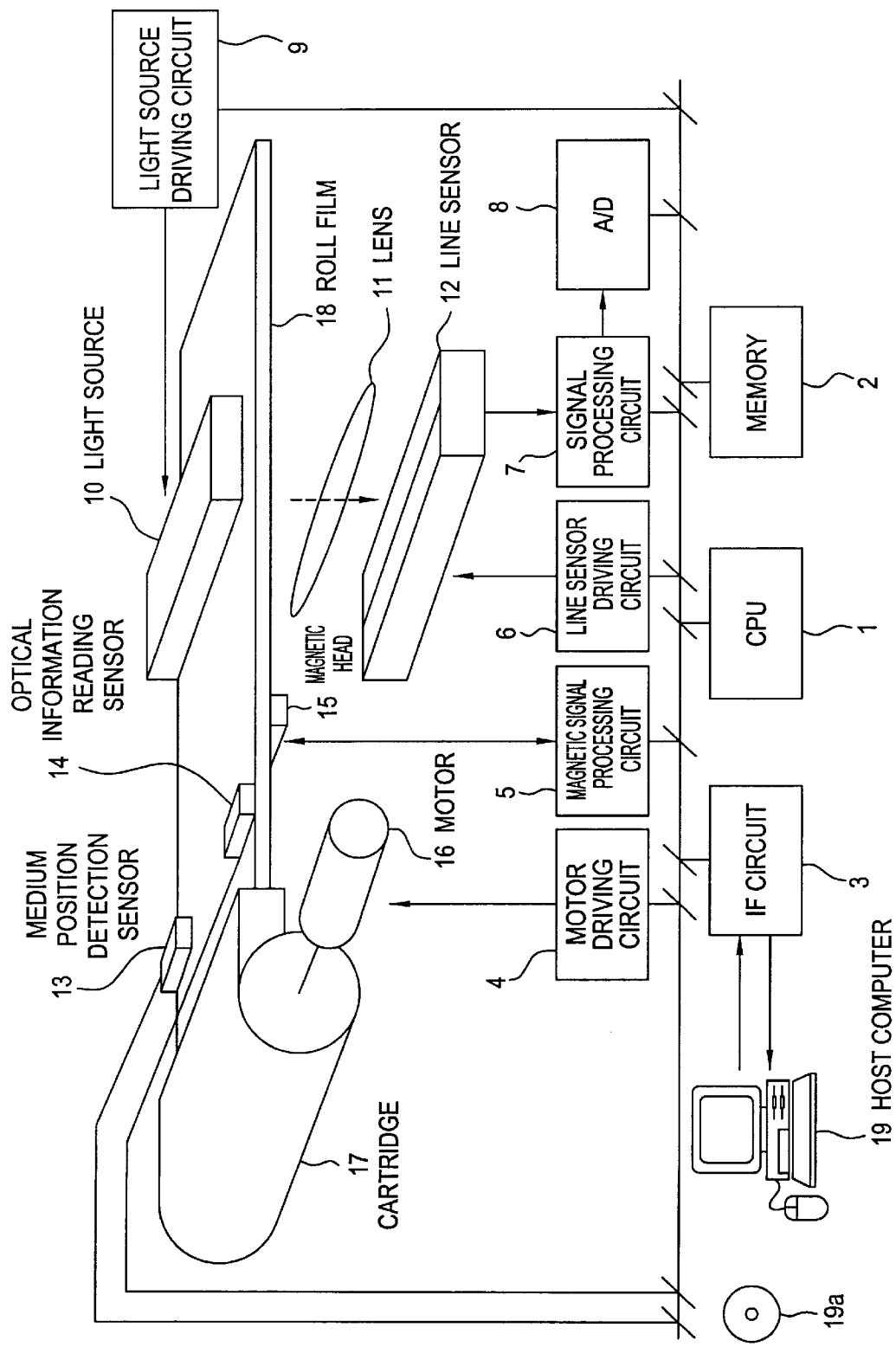
FIG. 1 is a schematic diagram of an image reading apparatus of an embodiment of the present invention.

FIG. 1 is a schematic diagram of an image reading apparatus of a configuration of one embodiment of the present invention. As described in FIG. 1, the image reading apparatus includes a central processing unit (hereafter, CPU) 1, a memory 2, an interface circuit (hereafter, IF circuit) 3, a motor driving circuit 4, a magnetic signal processing circuit 5, a line sensor driving circuit 6, a signal processing circuit 7, an A/D converter 8, a light source driving circuit 9, a light source 10, a lens 11, a line sensor 12, a medium position detection sensor 13, an optical information reading sensor 14, a magnetic head 15, a mounting chamber for a motor 16, a cartridge 17, a transport path of a roll film 18, which is scrolled from the cartridge 17 and the like. The IF circuit 3 is connected to the host computer 19. A control program of the host computer 19 is stored on a storage medium 19a, such as a CD-ROM.

Figure 2:
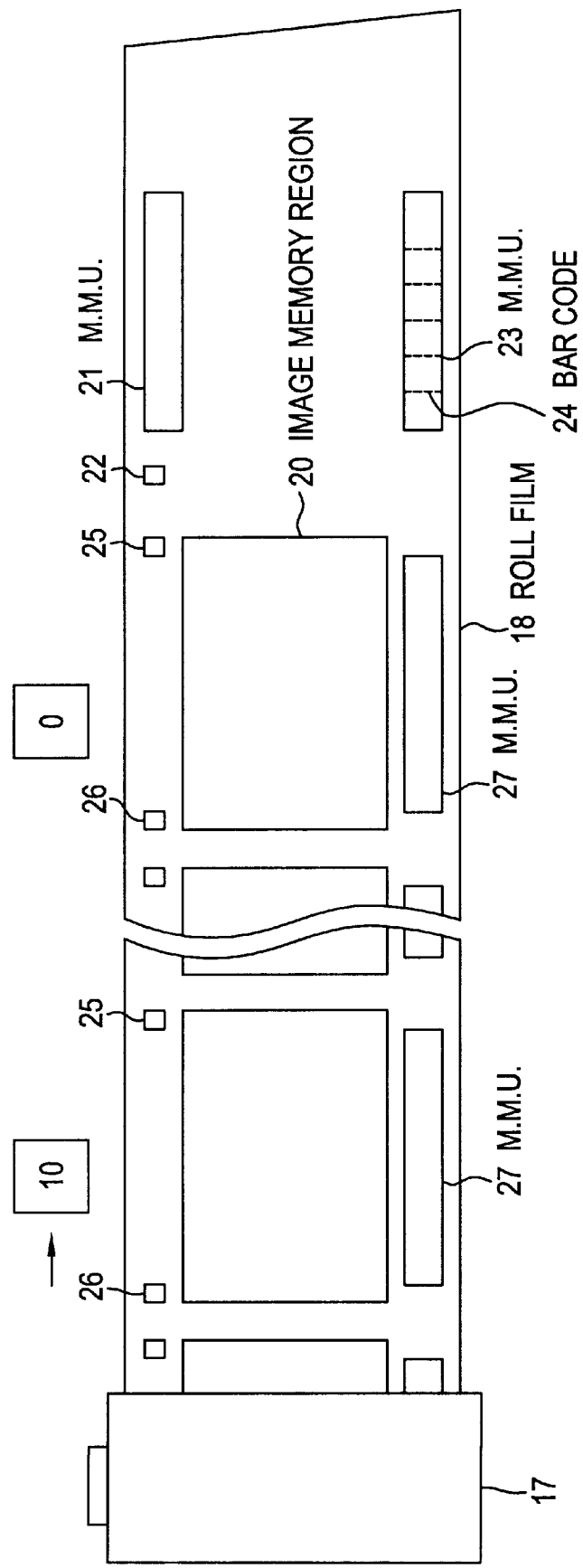
FIG. 2 is an external view of a strip of film (roll film).

The roll film 18 will first be described. FIG. 2 is an external view of the roll film. The roll film 18 in FIG. 2 is in the process of being scrolled from the cartridge 17.

As described in FIG. 2, specific regions in the tip edge (pulling edge) of the roll film 18 located in the right side of the figure are called a lead unit. Behind the lead unit, the image memory region 20 of each frame is arranged with a predetermined border.

A magnetic memory unit 21 and a perforation 22 are provided in the lead unit along one edge side in the length direction of the film. Additionally, a magnetic memory unit 23 and a bar code 24 are provided in the lead unit along the other edge side in the length direction of the film.

In each frame, two perforations 25, 26 are provided outside of the image memory region 20 along one edge in the length direction of the film. A magnetic memory unit 27 is provided outside of the image memory region 20 along the other edge in the length direction in each frame of the film.

As described above, film information of the film is stored in the magnetic memory units 21, 23. The bar code 24 indicates film information of the film. The film information includes a type and model of the film, frame number, total number of frames and the like. The type of the film indicates whether the film is color or black and white, and whether the film is positive or negative, and so on.

Information concerning shooting such as the frame number, title, shooting date, shooting conditions, the designated print size are recorded in each magnetic memory unit 27. The camera may write-in the information during shooting. No information is recorded in each magnetic memory unit 27 if a camera does not have a magnetic write-in function. The information may also be written in during image development.

Furthermore, usually a film manufacturer writes information in the magnetic memory units 21, 23 in the lead unit before shipping of the film. However, there may be special situations in which no information is written in the magnetic memory units 21, 23 of the lead unit.

There are several designated print sizes, for example, a high vision size (H size), a classic size (C size) and a panorama size (P size). The aspect ratio is 16:9 for H size, 3:2 for C size and 3:1 for P size.

A user mounts a cartridge 17 in the mounting chamber as illustrated in FIG. 1 by connecting the spool of the cartridge 17 to the axle of the motor 16. The user closes the lid of the mounting chamber. Then a power source is supplied to each circuit and each circuit is started.

The motor driving circuit 4 controls rotational velocity, rotational direction, stopping and the like of the motor 16 according to instructions from CPU 1. When the motor 16 is driven in the normal direction, the roll film 18 is scrolled from the cartridge 17 to the transport path. On the other hand, when the motor 16 is driven in reverse direction, the roll film 18 is wound from the transport path into the cartridge 17.

The medium position detection sensor 13 optically detects each perforation and sends information to CPU 1. The optical information sensor 14 reads bar-codes containing the film information and sends the information to CPU 1.

The magnetic head 15 reads the magnetic information of the magnetic memory units 21, 23 and 27 under the control of the magnetic signal processing circuit 5 and sends the information to CPU 1. The magnetic head 15 also writes information into the magnetic memory units 21, 23 and 27 under the control of the magnetic signal processing circuit 5.

The magnetic signal processing circuit 5 digitizes the magnetic information read by the magnetic head 15 and sends digitized information to CPU 1 under the control of CPU 1. Moreover, the magnetic signal processing circuit 5 sends the magnetic head 15 information to be written in the magnetic memory unit 27 under control of CPU 1.

The light source 10 illuminates one face of the roll film 18 under control of the light source driving circuit 9. The light source 10 is provided with three colors of light emitting diodes (hereafter LEDs) such as R (red), G (green) and B (blue). The light source driving circuit 9 controls the turning on and off of the three color LEDs of the light source 10 according to instruction from CPU 1.

Alternatively, the light source 10 may be a white-light light source. In this case, R(red), G(green) and B(blue) filters may be provided. A switching mechanism for switching between the three colors is useful if a three color filter is provided.

The lens 11 is adjusted and arranged to focus the light rays from the light source 10 transmitted through the roll film 18 to the light receiving surface of the line sensor 12.

The line sensor 12 is provided with an image accumulation unit which includes a plurality of photo-electric conversion units arranged in a row and a transfer unit to transfer electric charge accumulated in each image accumulation unit. The line sensor 12 is arranged such that the light receiving surface of the image accumulation units is perpendicular to the direction of the movement of the roll film 18.

The line sensor 12 is either a black and white image sensor or a color image sensor. The light source 10 used for the black and white image sensor is a light source which switches three colors of R(red), G(green) and B(blue) or is a white light source. The light source 10 which is used for a color image sensor is a white light source.

The line sensor driving circuit 6 executes mainly the following control operation under direction of CPU 1. The line sensor driving circuit 6 controls accumulation operation and accumulation time of the line sensor 12. In particular, the line sensor driving circuit 6 controls the main scanning operation which discharges the accumulated electric charge (image signals/electric signals) to the signal processing circuit 7.

The signal processing circuit 7 amplifies the signals from the line sensor 12, executes signal processing and sends the result to the A/D converter 8 according to instruction from CPU 1. The signal processing includes processing such as CDS (correlated double sampling), shading correction, dark current correction, and even-odd correction.

The A/D converter 8 converts image signals which are sent from the signal processing circuit 7 into digital signals with predetermined bit numbers and sends the converted signals to CPU 1. The word length, for example, is eight bits.

CPU 1 executes at least the following control operation according to the program selected from memory 2. CPU 1 controls the motor driving circuit 4, the magnetic signal processing circuit 5, the line sensor driving circuit 6 and the light source driving circuit 9, and, through the above circuits, reads the roll film 18. CPU 1 sets the accumulation time and the like according to the exposure conditions obtained from the host computer 19.

Also, CPU 1 executes position detection of perforation and decoding of the contents of the bar codes based on outputs from the medium position detection sensor 13 and the optical information reading sensor 14.

Further, CPU 1 reads magnetic information and film image which are read by controlling the magnetic signal processing circuit 5, signal process circuit 7 and the A/D converter 8 and stores them in the memory 2. CPU 1 stores the line data (image data) equivalent of one or several frames which are read in the memory 2 as line data (image data) of three colors R(red), G(green) and B(blue) or as one of the line data (image data) of three colors R(red), G(green) and B(blue).

Additionally, CPU 1 obtains data (screen size, display color numbers) concerning the monitor screen from the host computer 19 through IF circuit 3. The reading resolution is determined by considering the relationship between the number of frames and the screen size. CPU 1 also obtains exposure condition setting data, which is set by the user on the monitor screen, from the host computer 19 through IF circuit 3.

The memory 2 consists of a program memory and a working memory. At least selection screen data, index display setting screen data and the like are also stored in the memory 2.

The IF circuit 3 of the configuration of the present embodiment is SCSI (Small Computer System Interface). The IF circuit 3 outputs the line data (image data) stored in the memory 2 to the host computer 19. Moreover, the IF circuit 3 sends frame designation and other commands and monitor screen information from the host computer 19 to CPU 1.

The host computer 19 has a monitor which is a display apparatus, a keyboard which is an input device, a mouse and the like. The host computer 19 displays the image data received from the IF circuit 3 to the monitor. The host computer 19 sends the commands which are input from the keyboard and the mouse to the IF circuit 3.

The roll film 18 is one example of a strip film medium usable with the invention. The light source 10 is one example of an illumination means usable with the invention. The line sensor 12 is one example of an image reading means usable with the invention. The motor 16 is one example of a moving means usable with the invention.

The magnetic head 15 is an example of a magnetic information reading means usable with the invention. Medium position detection sensor 13 is an example of a detection means usable with the invention. The optical information reading sensor 14 is an example of a conversion means usable with the invention. CPU 1 is an example of a film information acquisition means, recognition means, setting means, determination means and data generation means usable with the invention.

Figure 3:
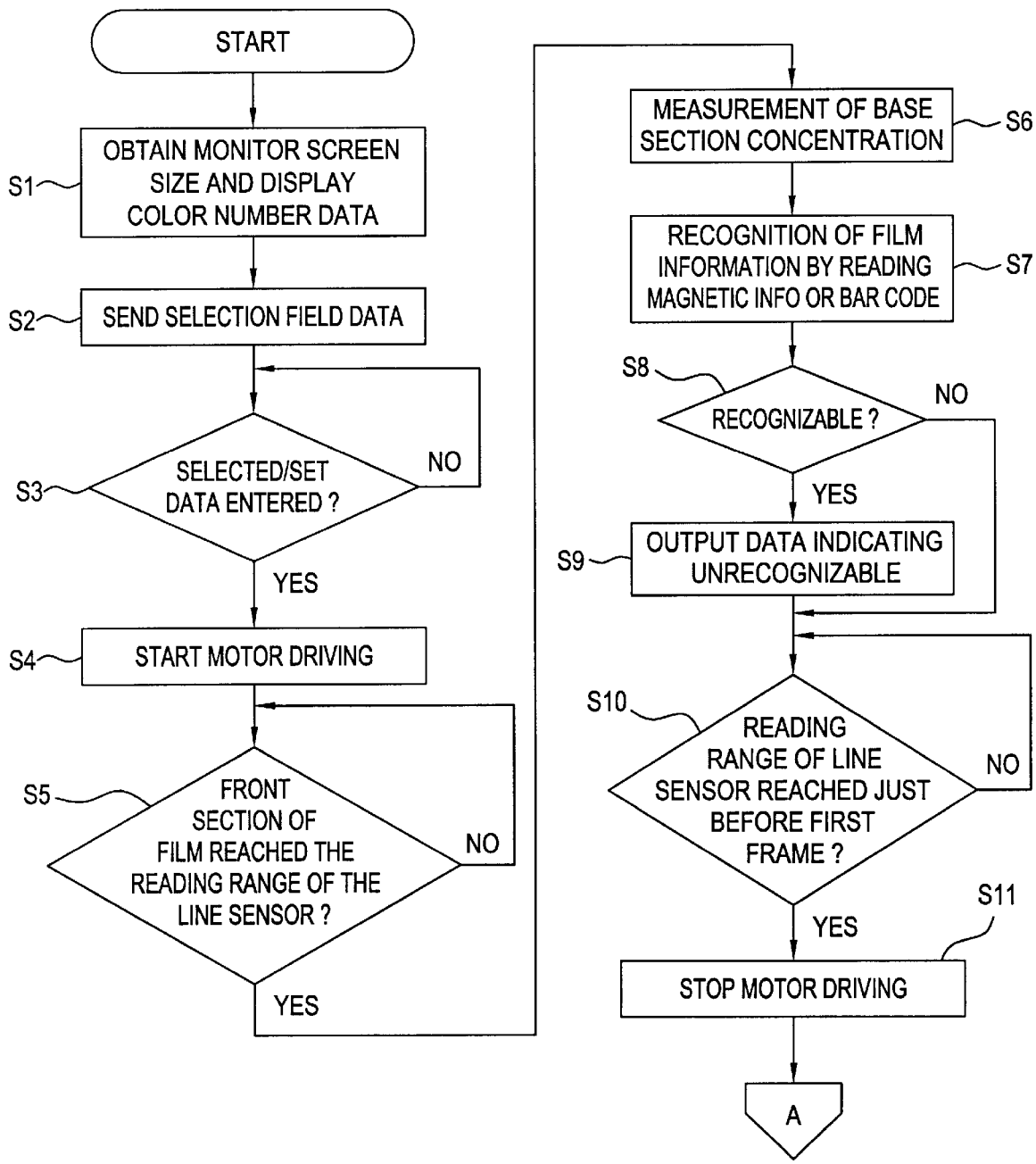
FIG. 3 is a flow chart of a first part of the initial operation of an embodiment of the present invention.
Figure 4:
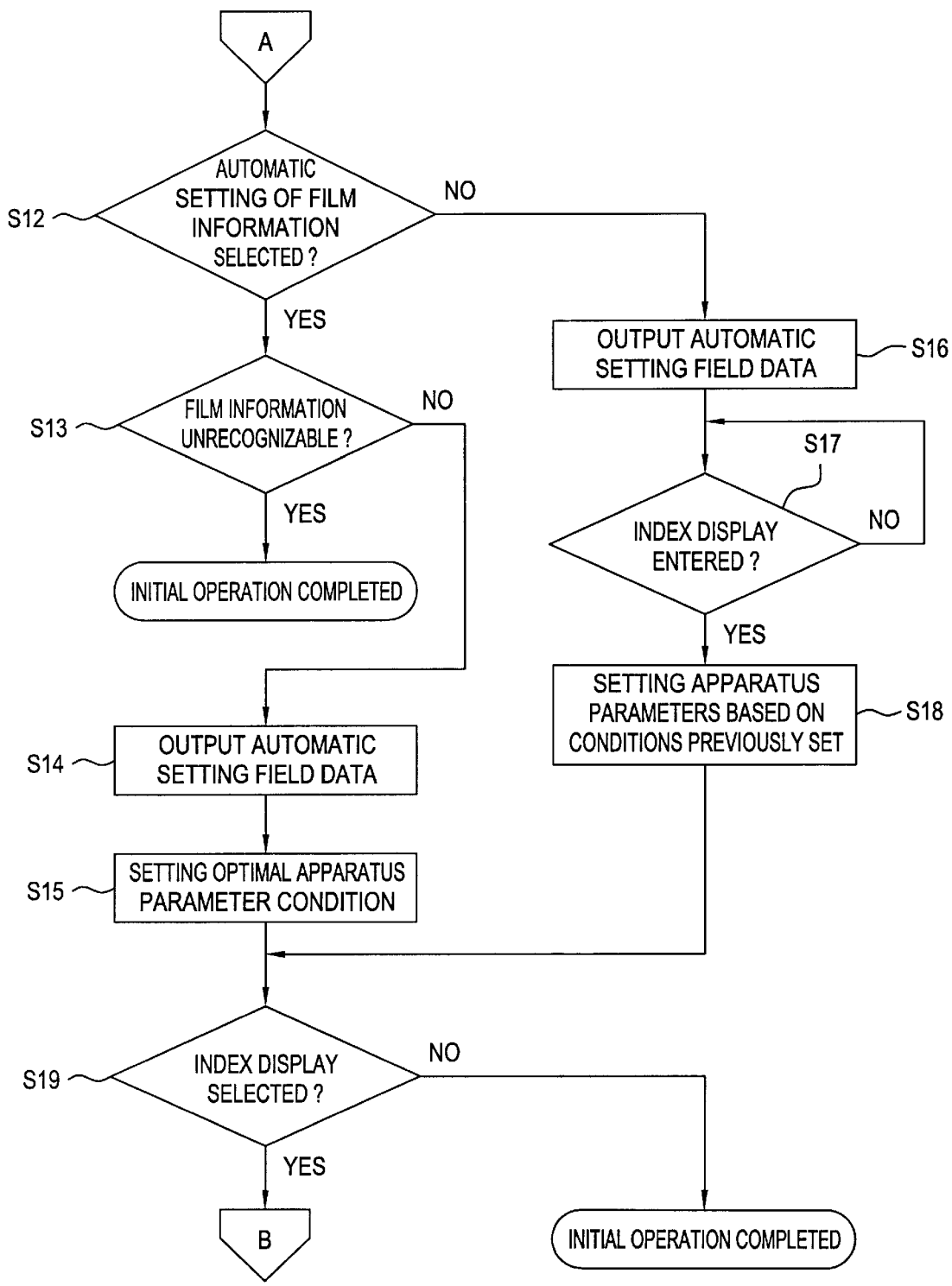
FIG. 4 is a flow chart of a second part of the initial operation of an embodiment of the present invention.
Figure 5A:
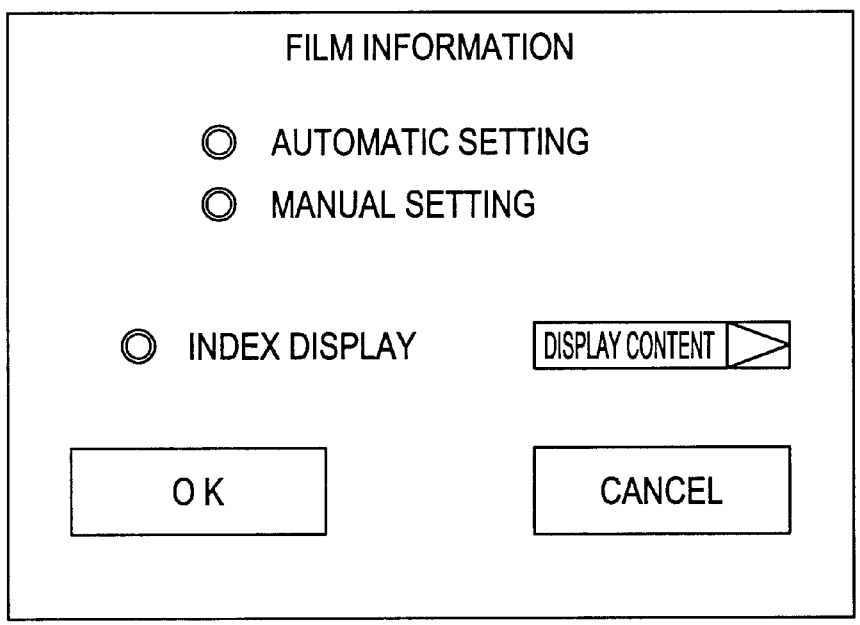
FIG. 5(a) is a drawing describing an example of the selection screen at the time of starting an initial operation.

FIG. 3 and FIG. 4 are flow charts describing initial operation in accordance with the present invention. FIG. 5(a) and (b) describe examples of the selection screen displays. FIG. 6 describes examples of film information manual setting screen displays. FIG. 8–FIG. 10 describe examples of index display setting screen displays.

Figure 11:
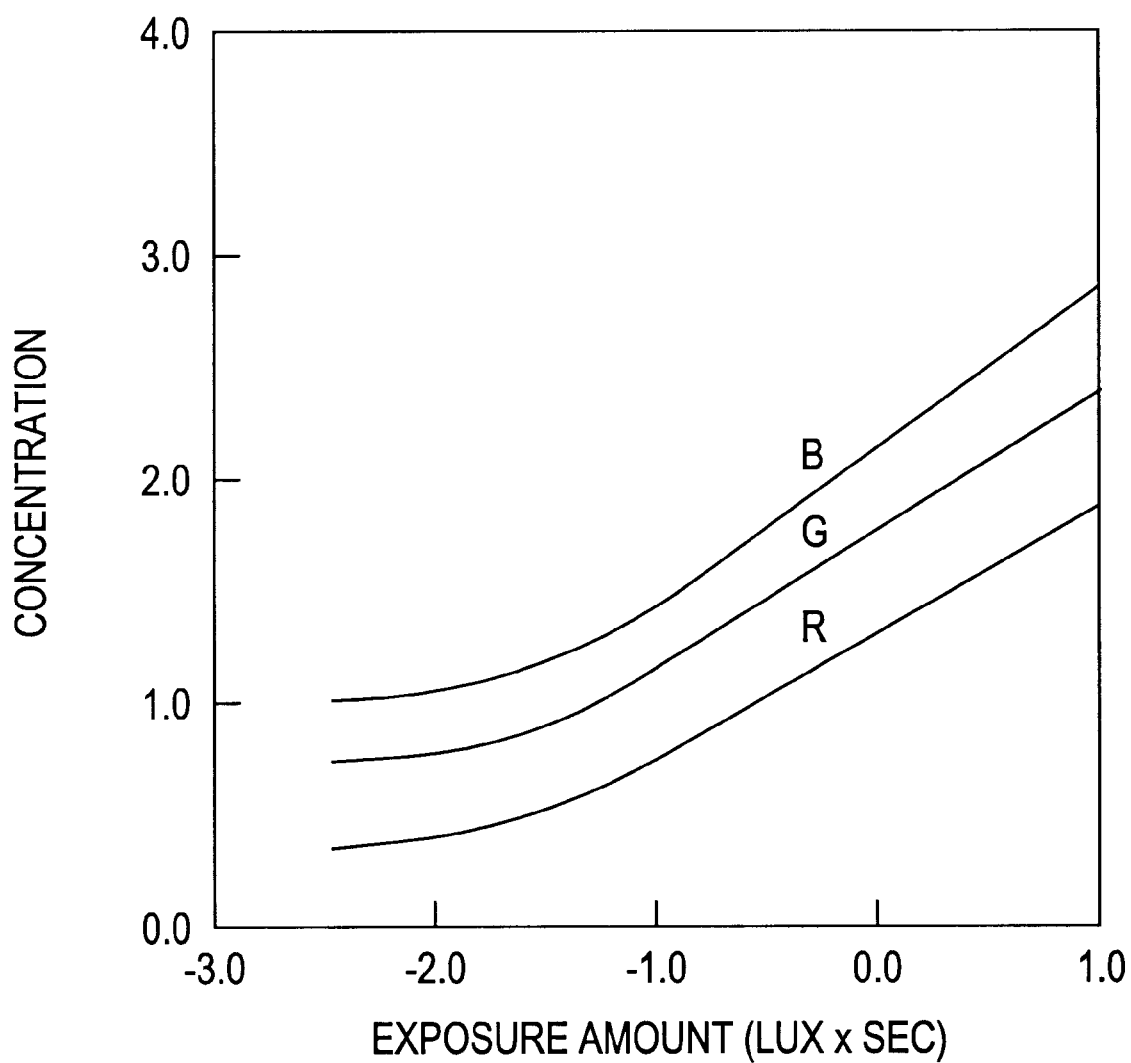
FIG. 11 is a drawing describing the relationship between exposure amount and base concentration of a negative film.
Figure 12:
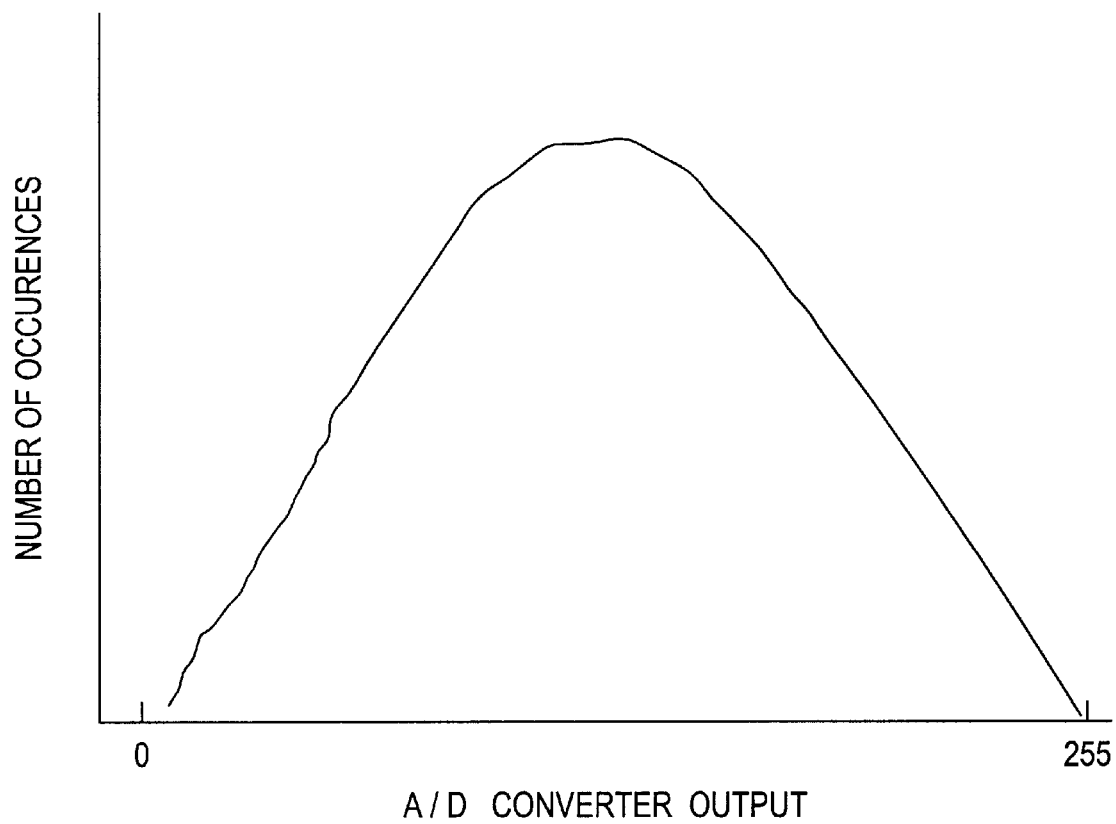
FIG. 12 is a drawing describing concentration distribution based on an ideal exposure time.
Figure 13:
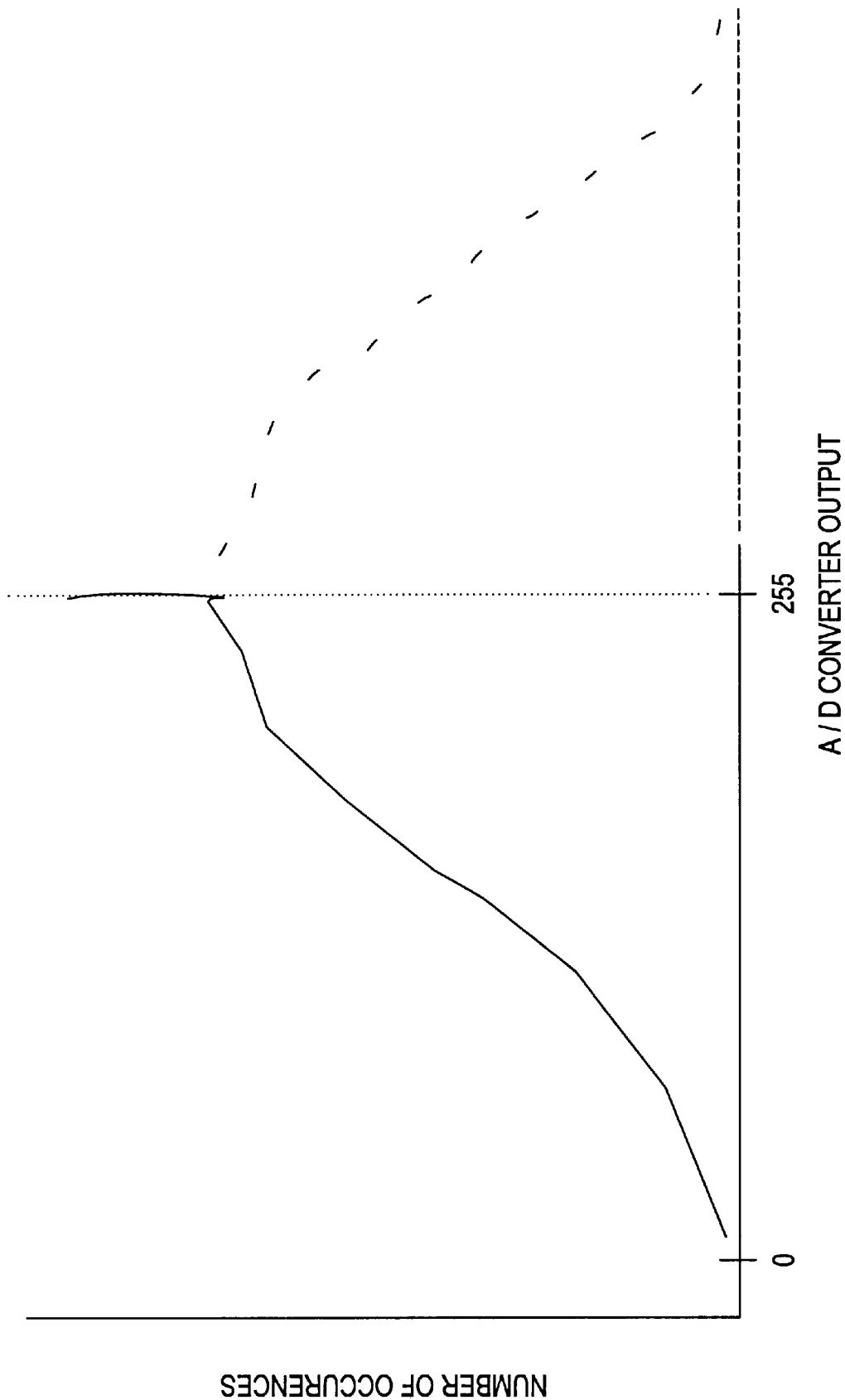
FIG. 13 is a drawing describing concentration distribution, when the exposure time is too long.
Figure 14:
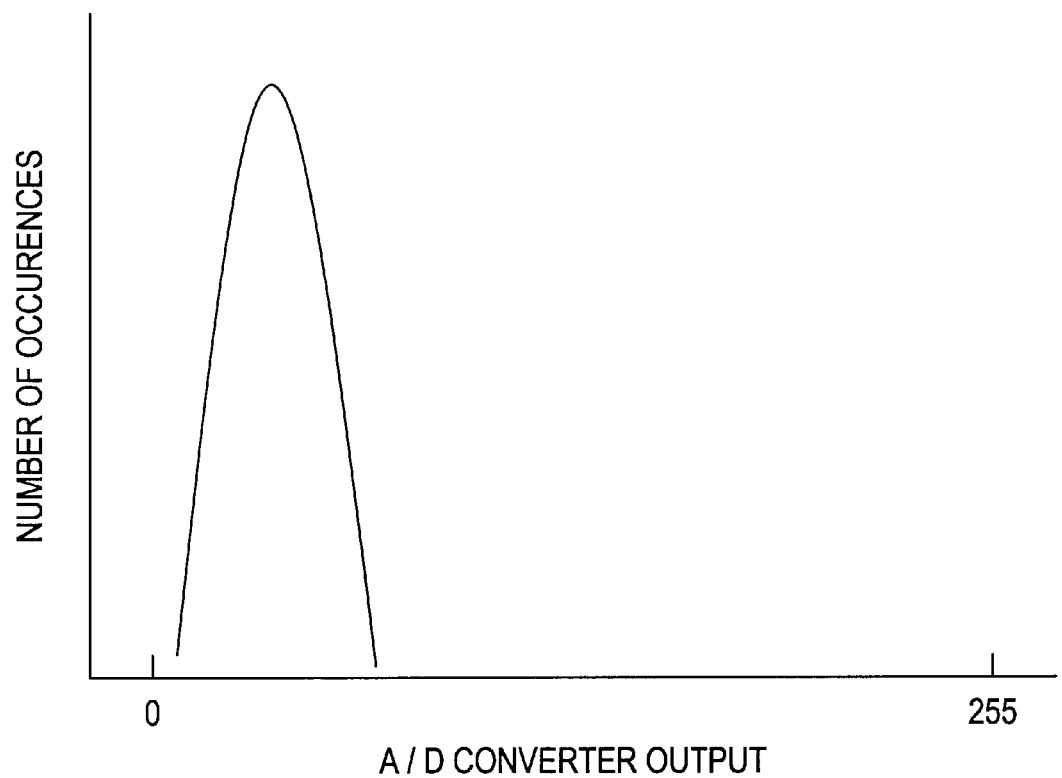
FIG. 14 is a drawing describing concentration distribution, when the exposure time is too short.

FIG. 11 describes a relationship between the exposure amount and the base concentration of the negative film. FIG. 12 describes the concentration distribution based on an ideal exposure time. FIG. 13 describes the concentration distribution resulting from exposure time which is too long. FIG. 14 describes the concentration distribution resulting from exposure time which is too short.

Figure 15:
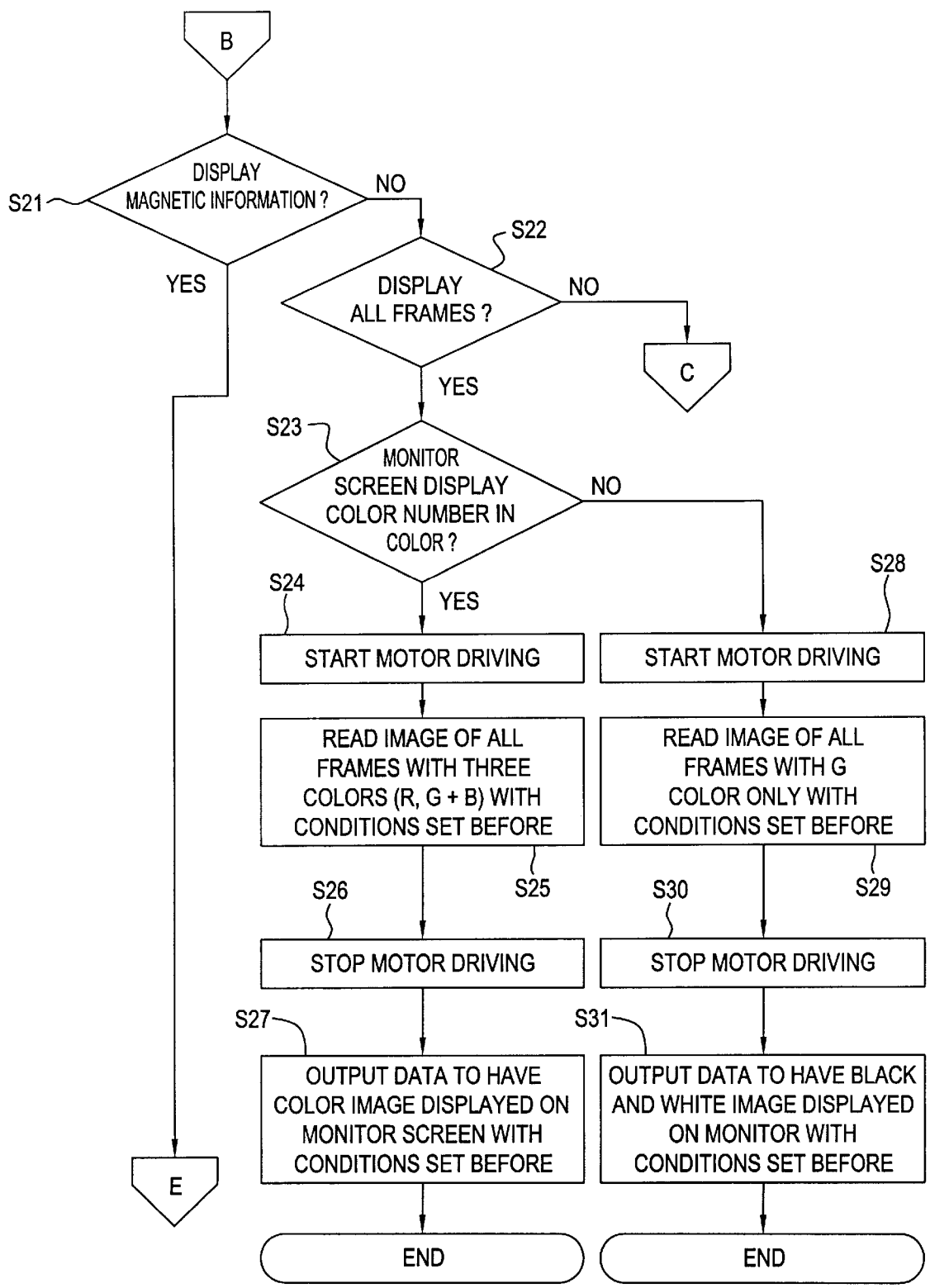
FIG. 15 is a flow chart of a first part of the index display data generation process in an embodiment of the present invention (index display of image only).
Figure 16:
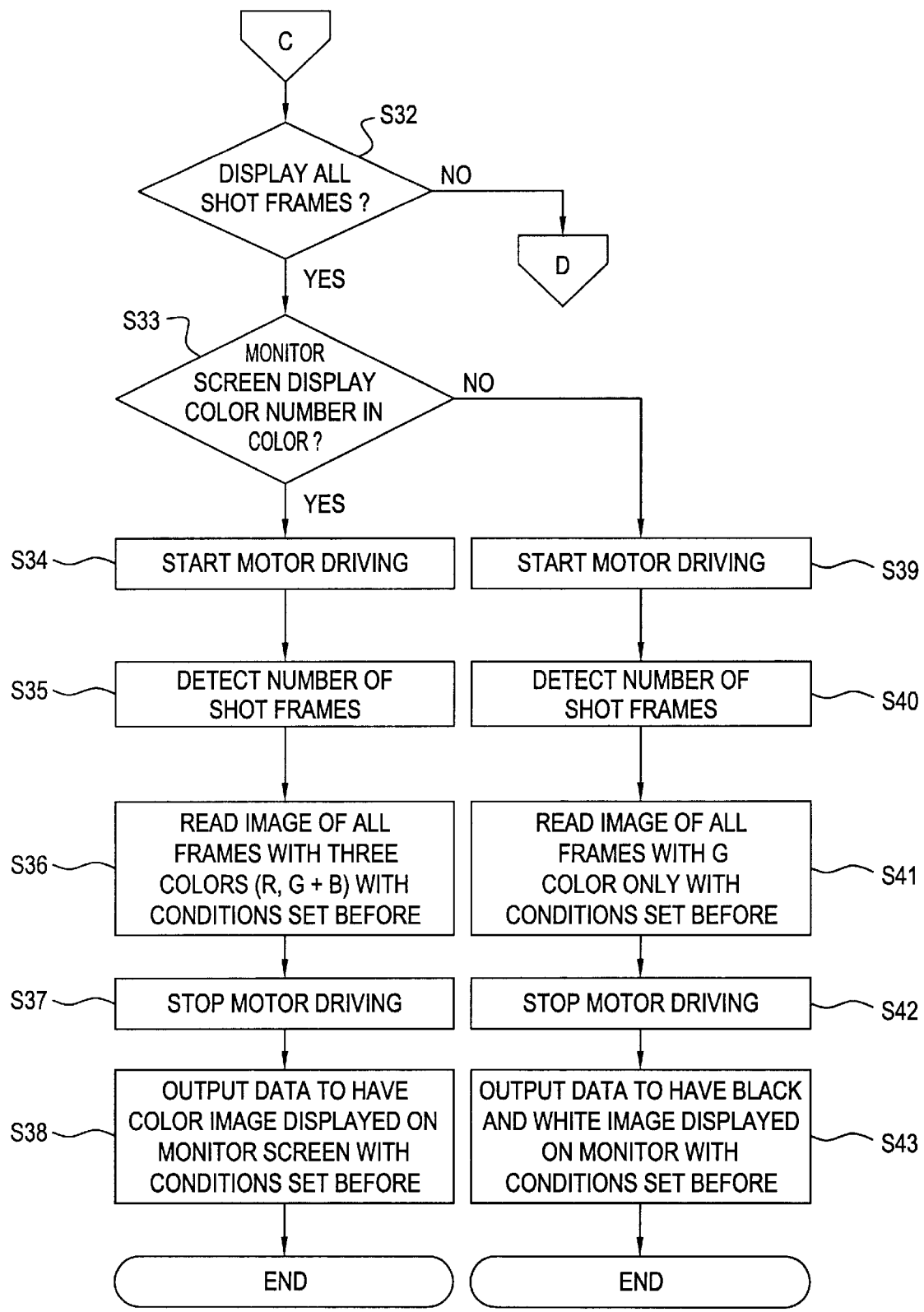
FIG. 16 is a flow chart of a second part of the index display data generation process in an embodiment of the present invention (index display of image only).
Figure 17:
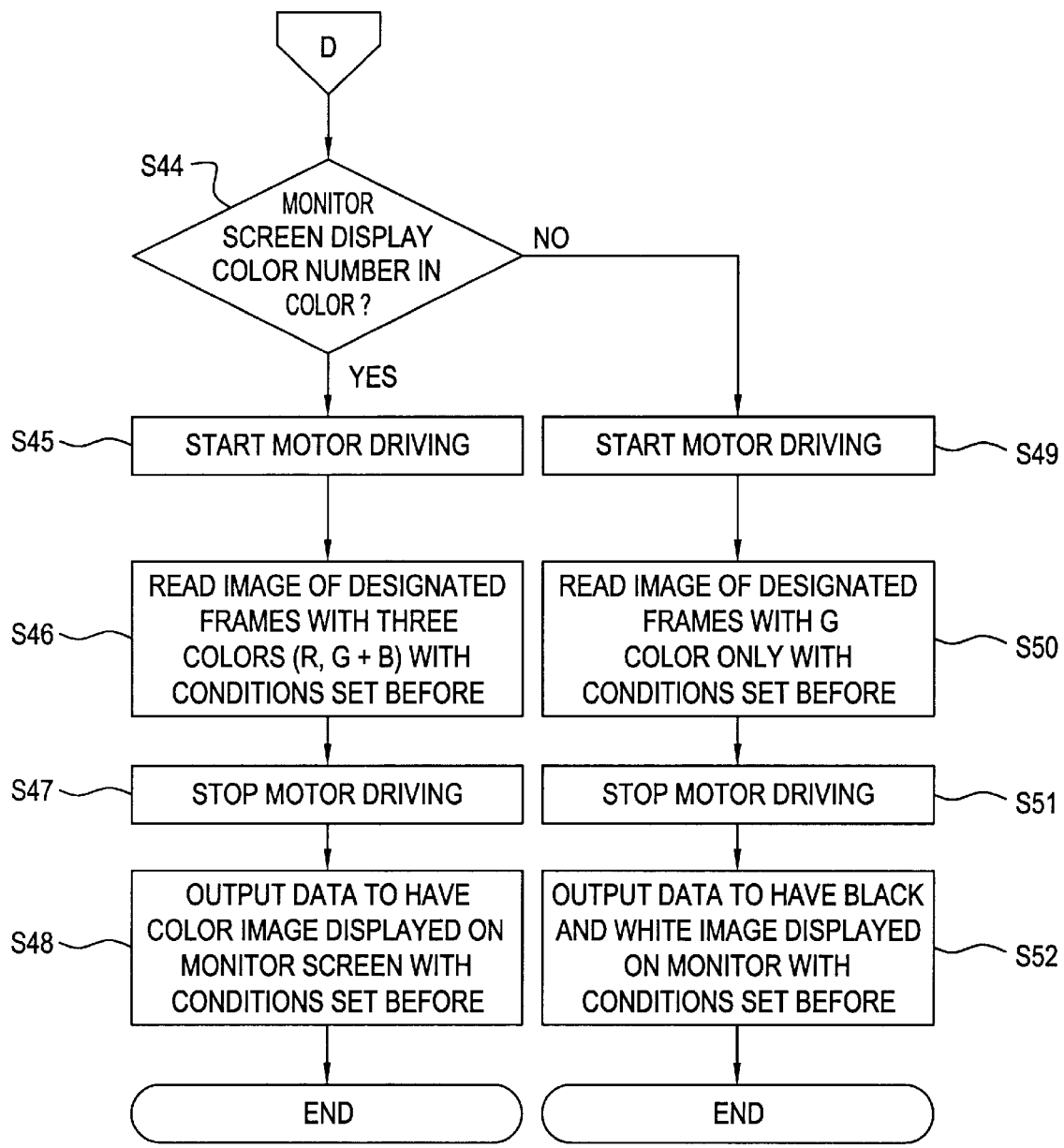
FIG. 17 is a flow chart of a third part of the index display data generation process in an embodiment of the present invention (index display of image only).
Figure 18:
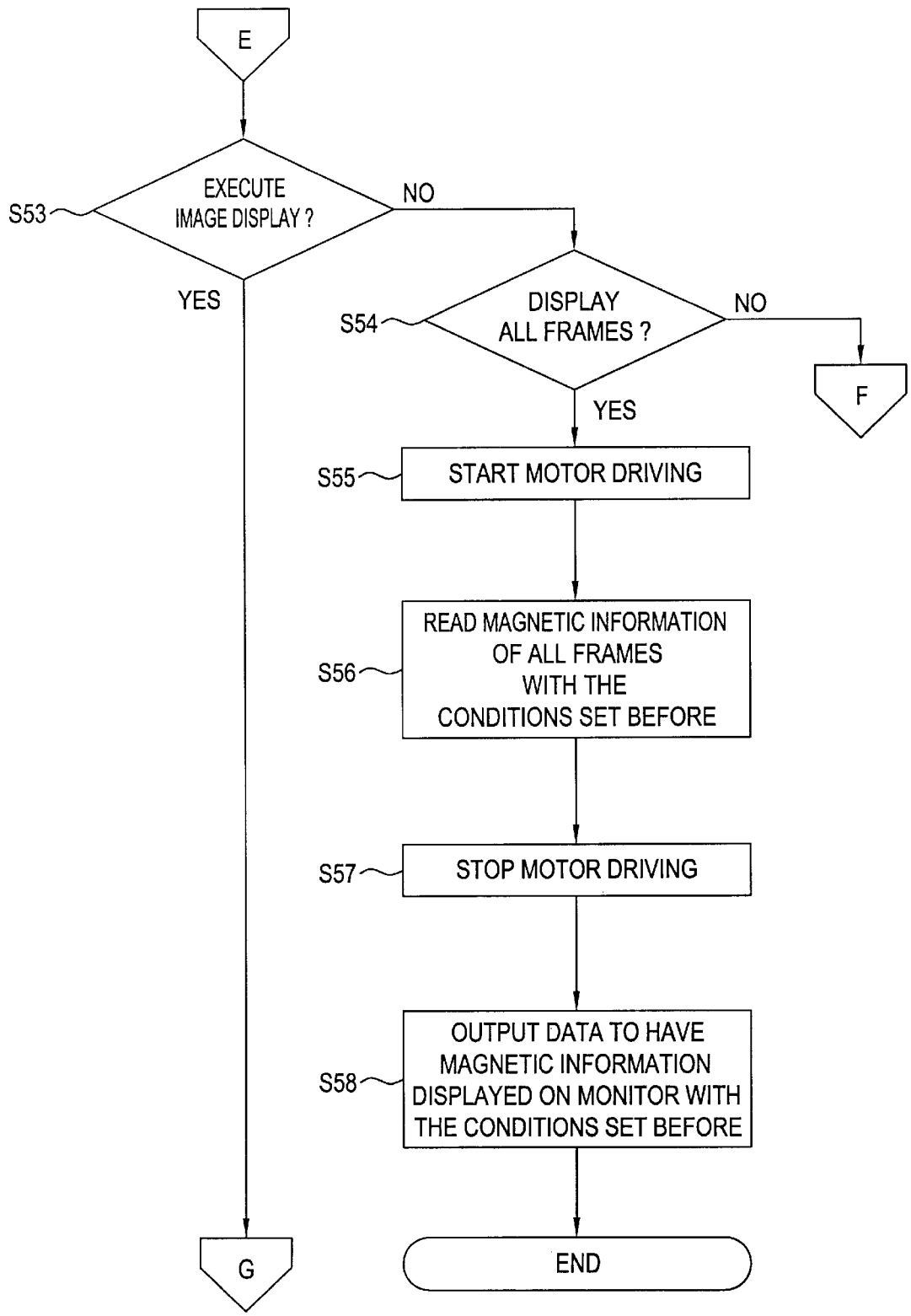
FIG. 18 is a flow chart of a first part of the index display data generation process in an embodiment of the present invention (index display of magnetic information only).
Figure 19:
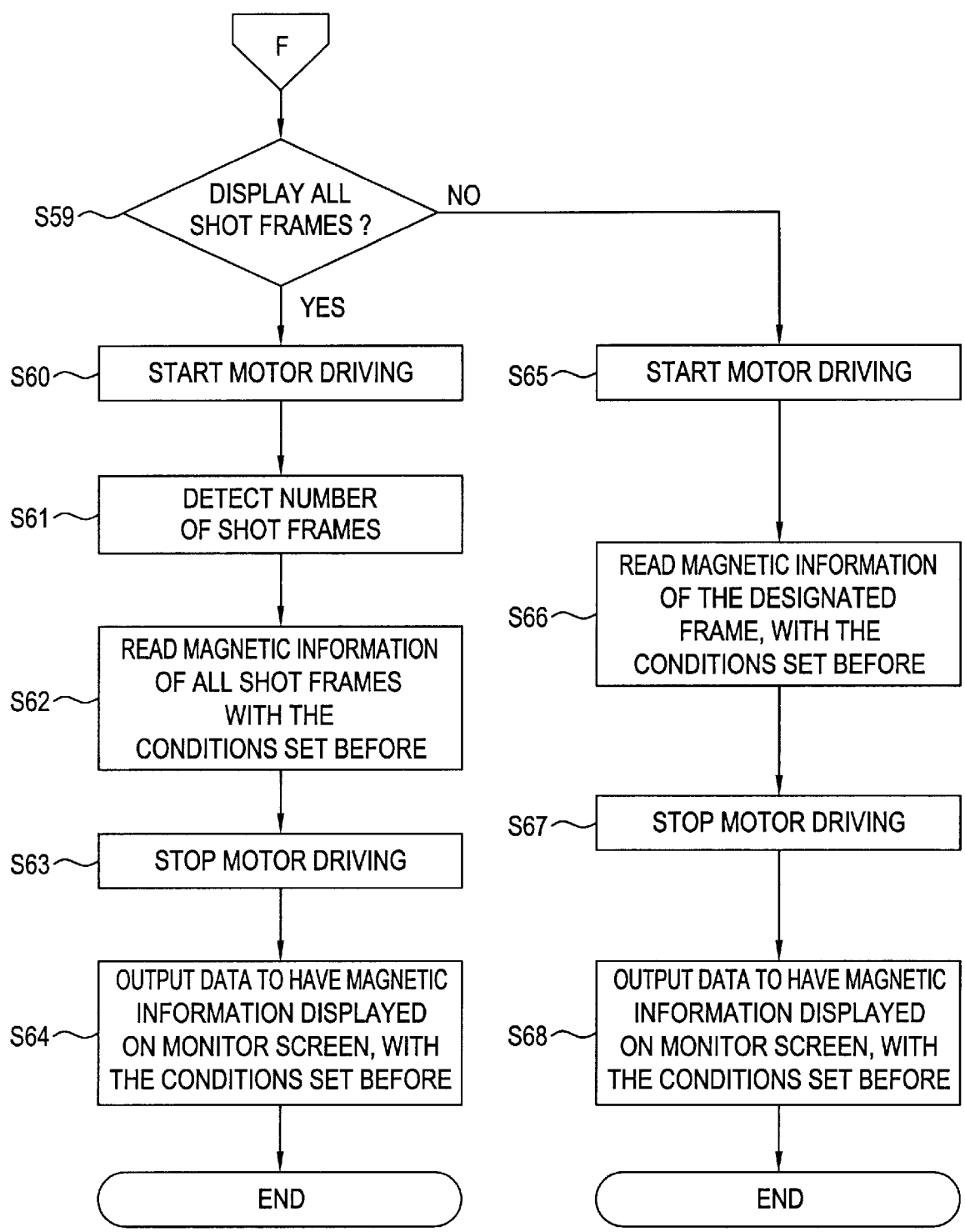
FIG. 19 is a flow chart of a second part of the index display data generation process in an embodiment of the present invention (index display of magnetic information only).
Figure 20:
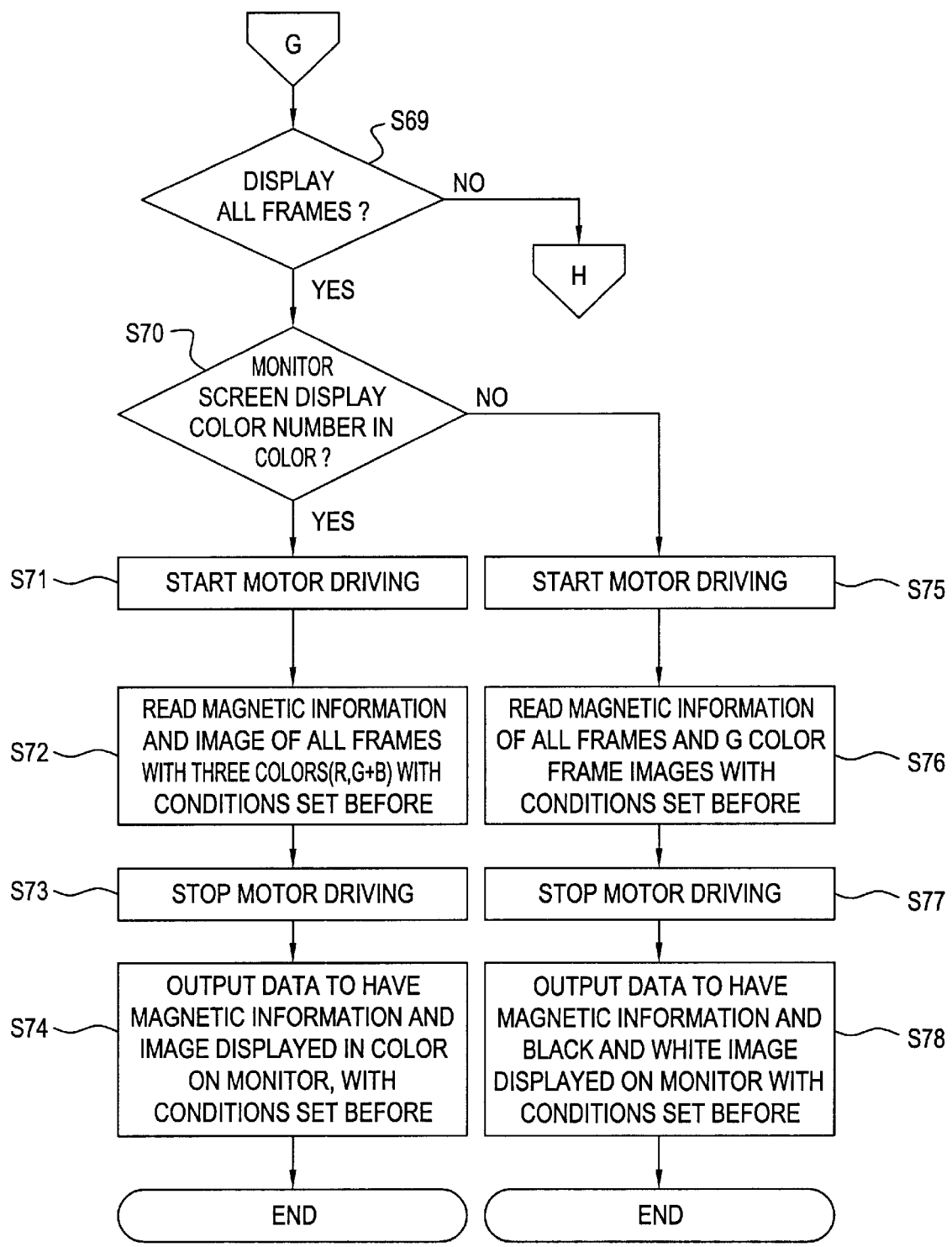
FIG. 20 is a flow chart of a third part of the index display data generation process in an embodiment of the present invention (index display of magnetic information and image).
Figure 21:
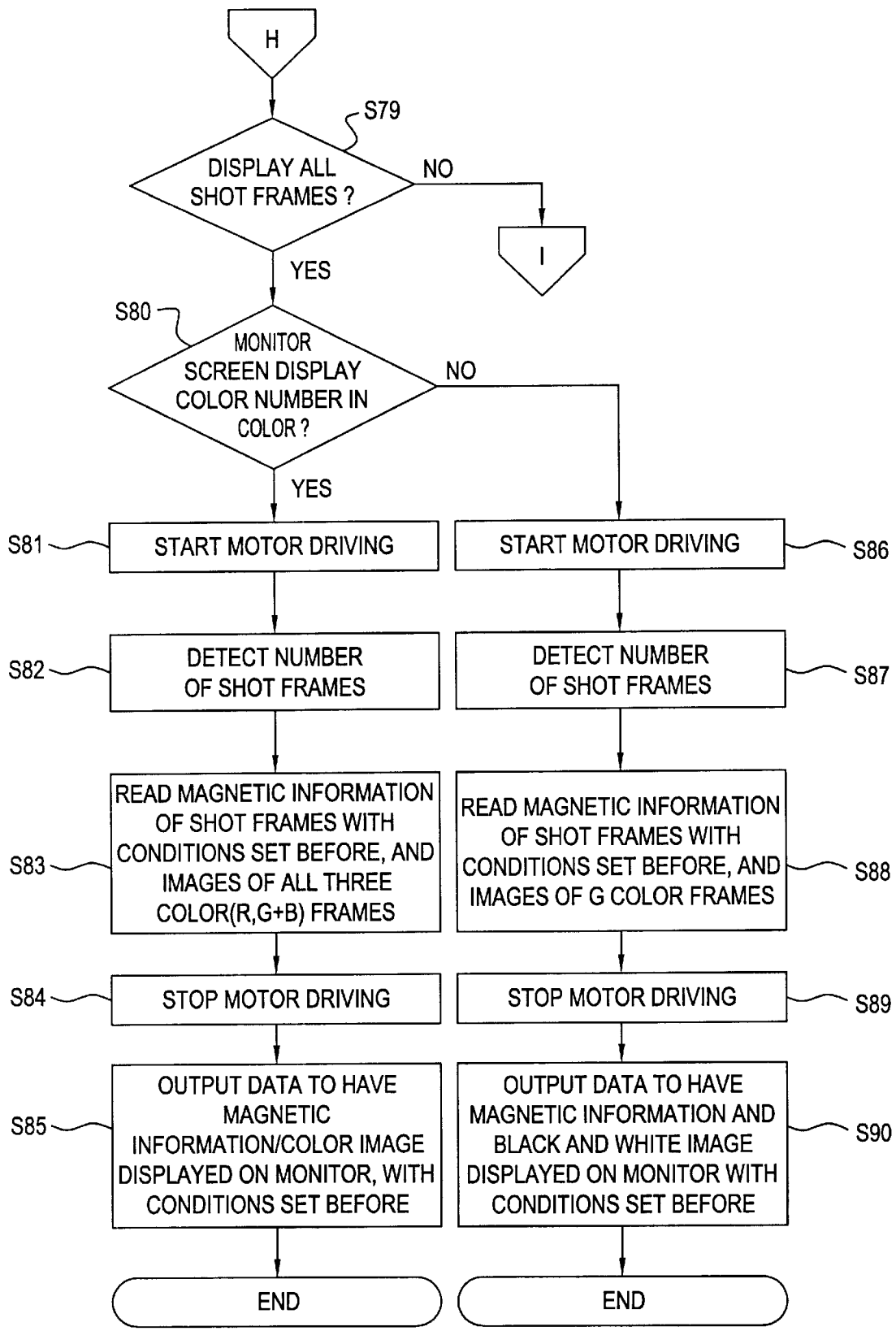
FIG. 21 is a flow chart of the index display data generation process in an embodiment of the present invention (index display of magnetic information and image).
Figure 22:
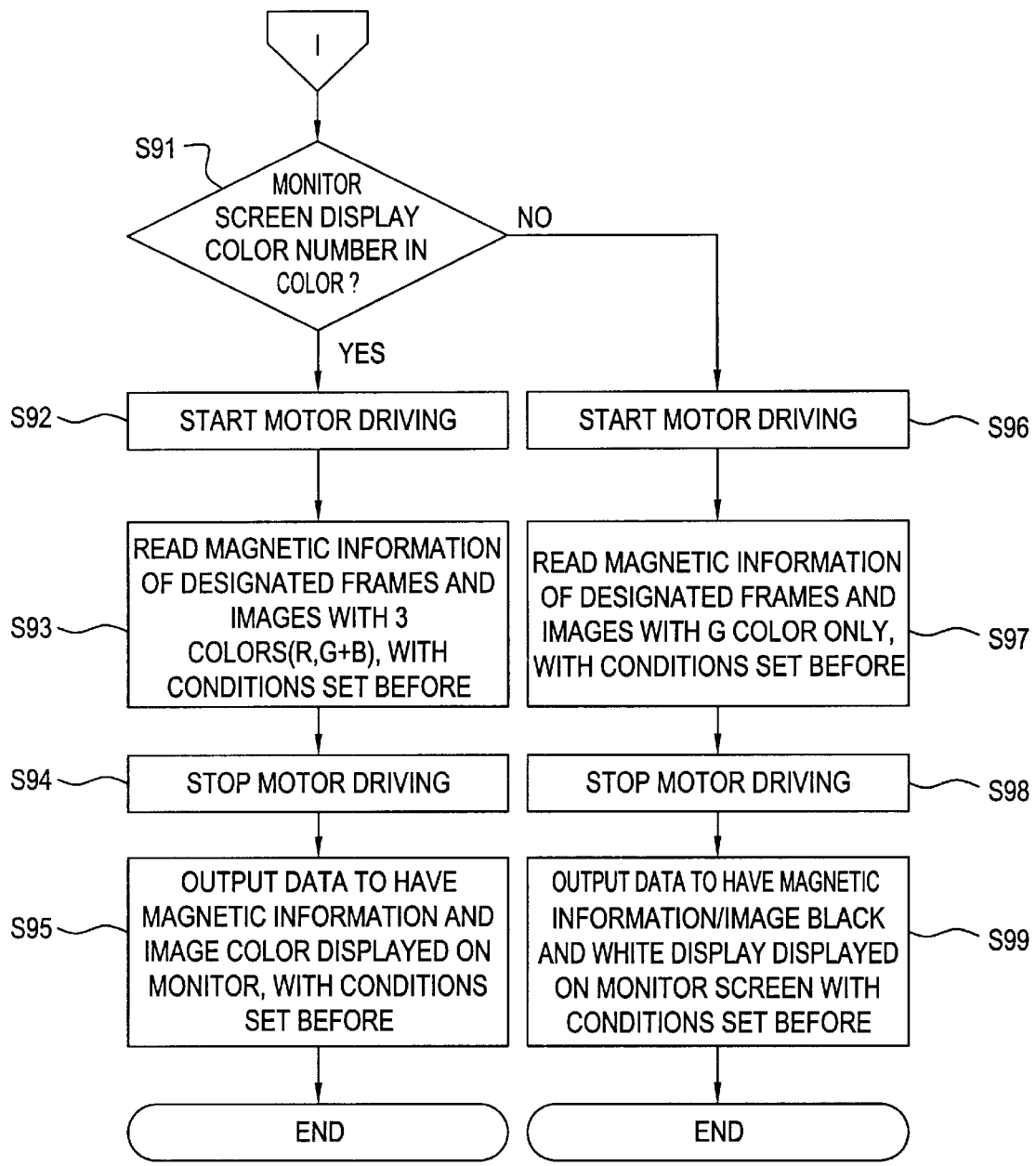
FIG. 22 is a flow chart of the index display data generation process in an embodiment of the present invention (index display of magnetic information and image).

FIG. 15–FIG. 22 are flow charts of index display data generation operation in accordance with the present invention. FIG. 15–FIG. 17 relate to an index display of the image. FIG. 18 and FIG. 19 relate to an index display of the magnetic information. FIG. 20–FIG. 22 relate to an index display of the magnetic information and the image.

Figure 23A:
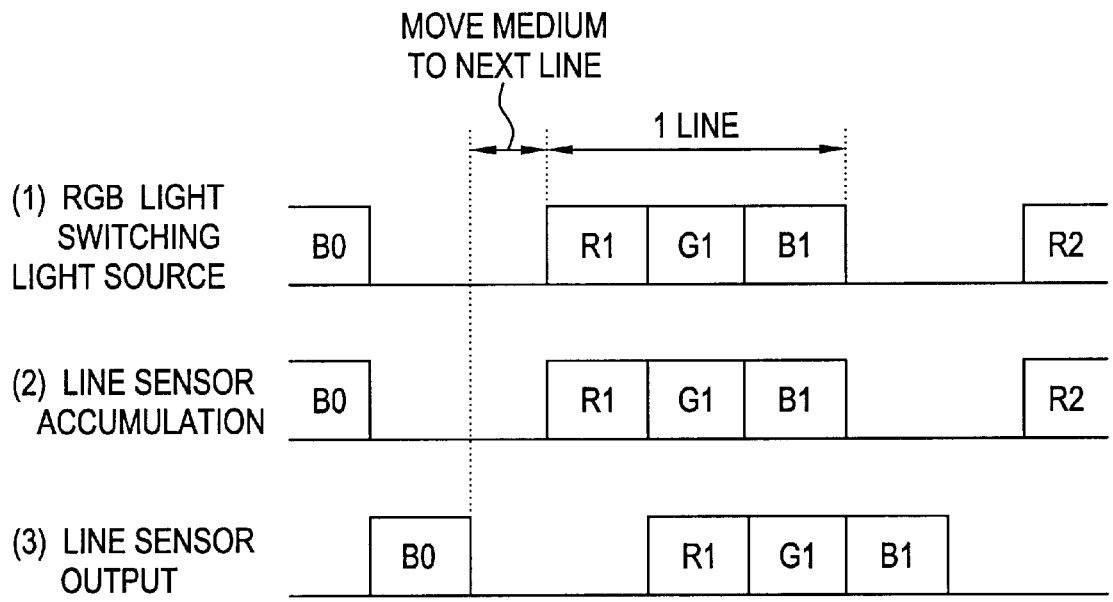
FIG. 23(a) is a time chart of the image reading by RGB switching for color reading.
Figure 23B:
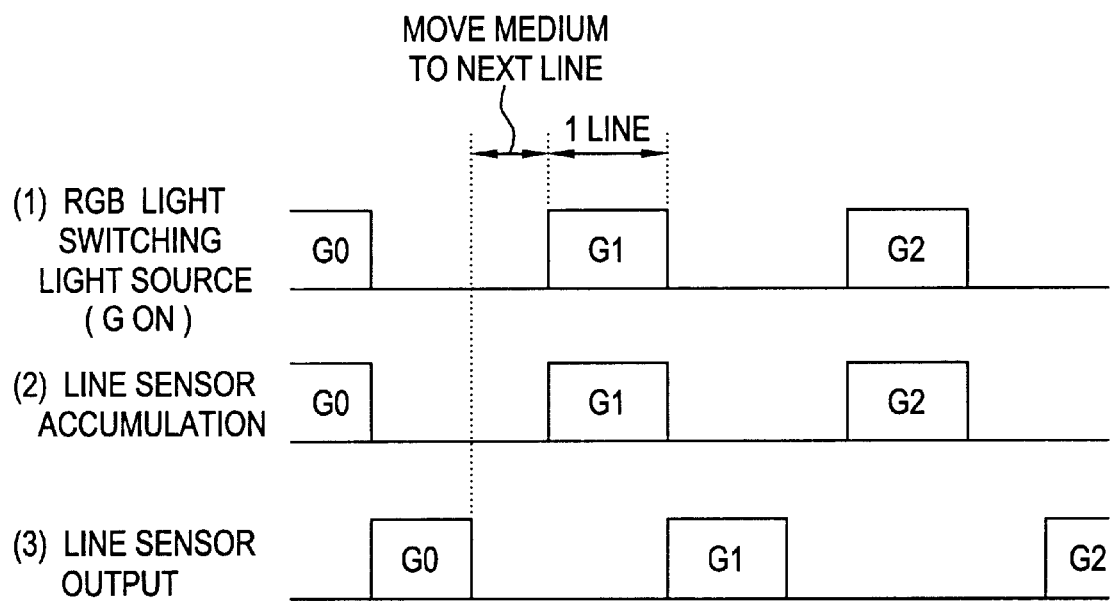
FIG. 23(b) is a time chart of the image reading by RGB switching for black and white reading.

FIG. 23–FIG. 26 are time charts for the image reading. FIG. 23 is a time chart for color reading by RGB switching and for black and white reading. FIG. 24 is a time chart for color reading by the color image sensor and for black and white reading.

Figure 25:
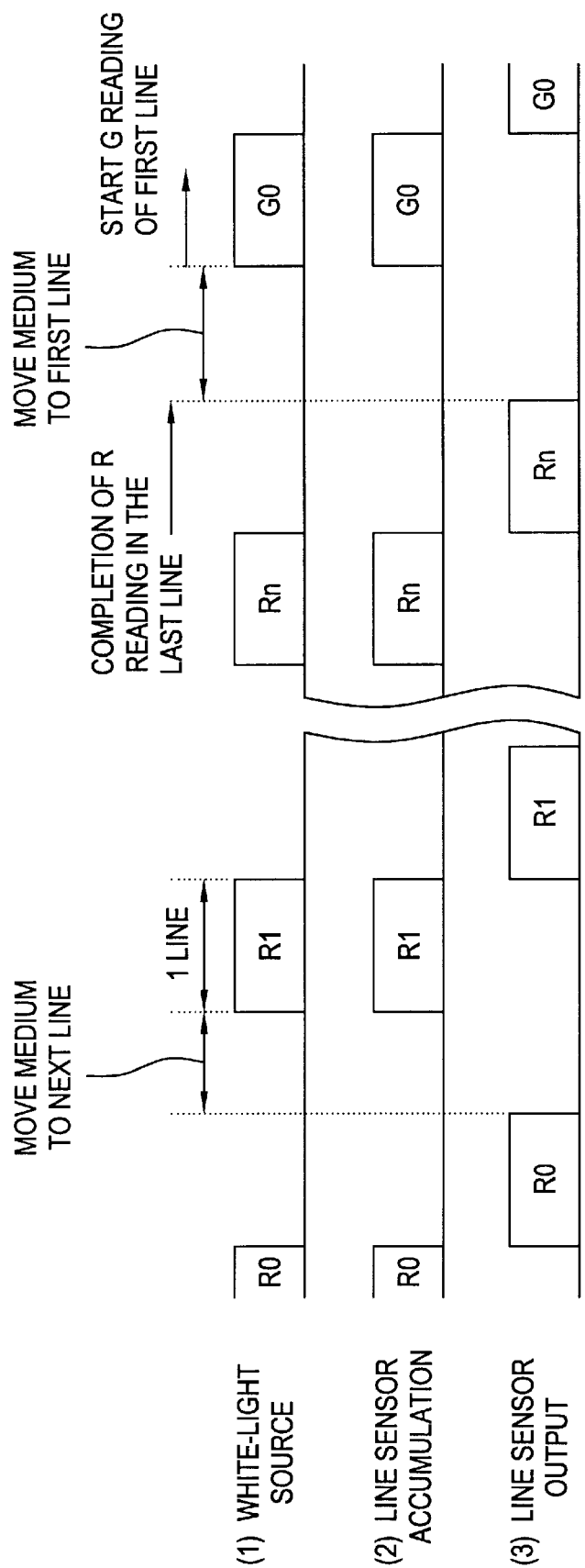
FIG. 25 is a time chart of the image reading by white-light+RGB filter switching for three path color reading.
Figure 26:
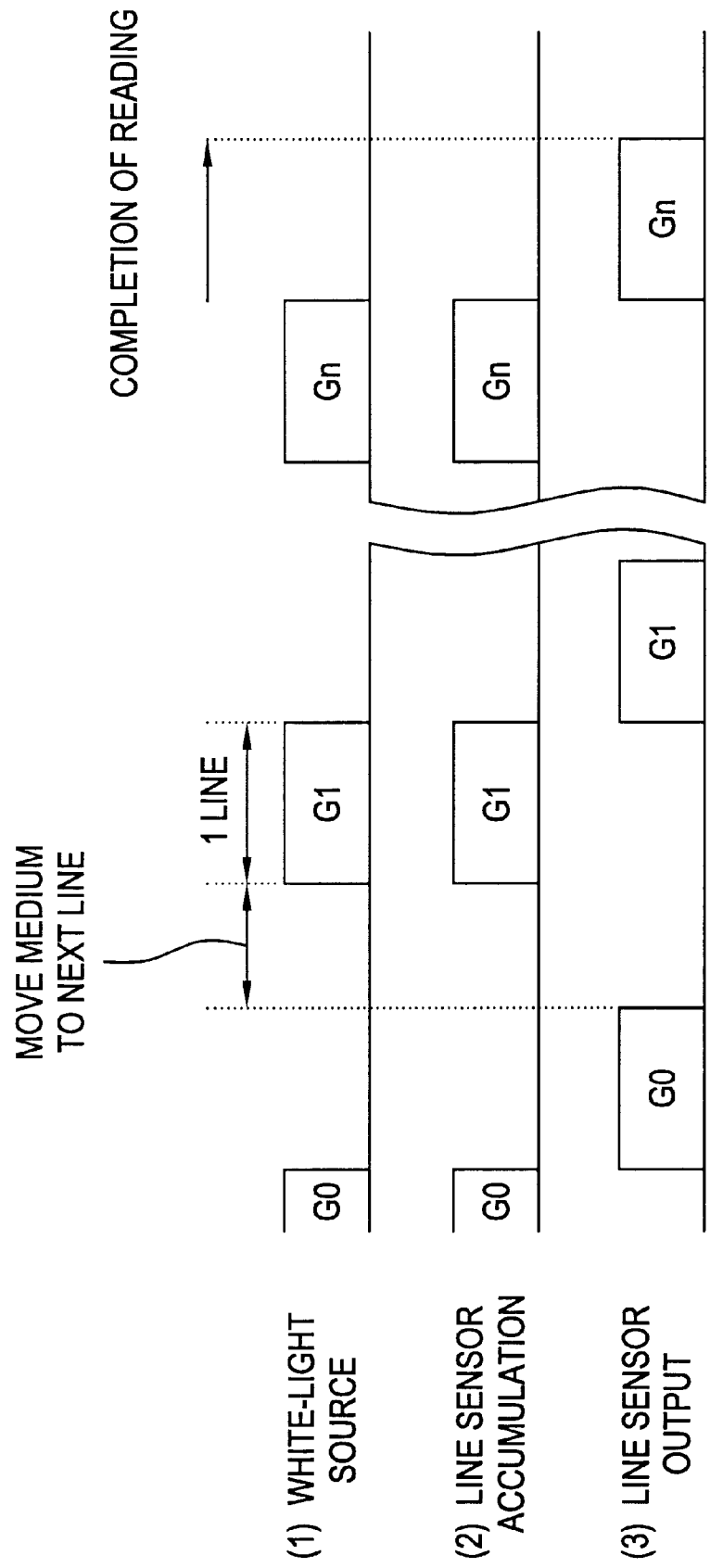
FIG. 26 is a time chart of the image reading by white-light+G filter switching for black and white reading.

FIG. 25 is a time chart for color reading by white light and RGB filter switching. FIG. 26 is a time chart for black and white reading by white light and a G filter.

Figure 27:
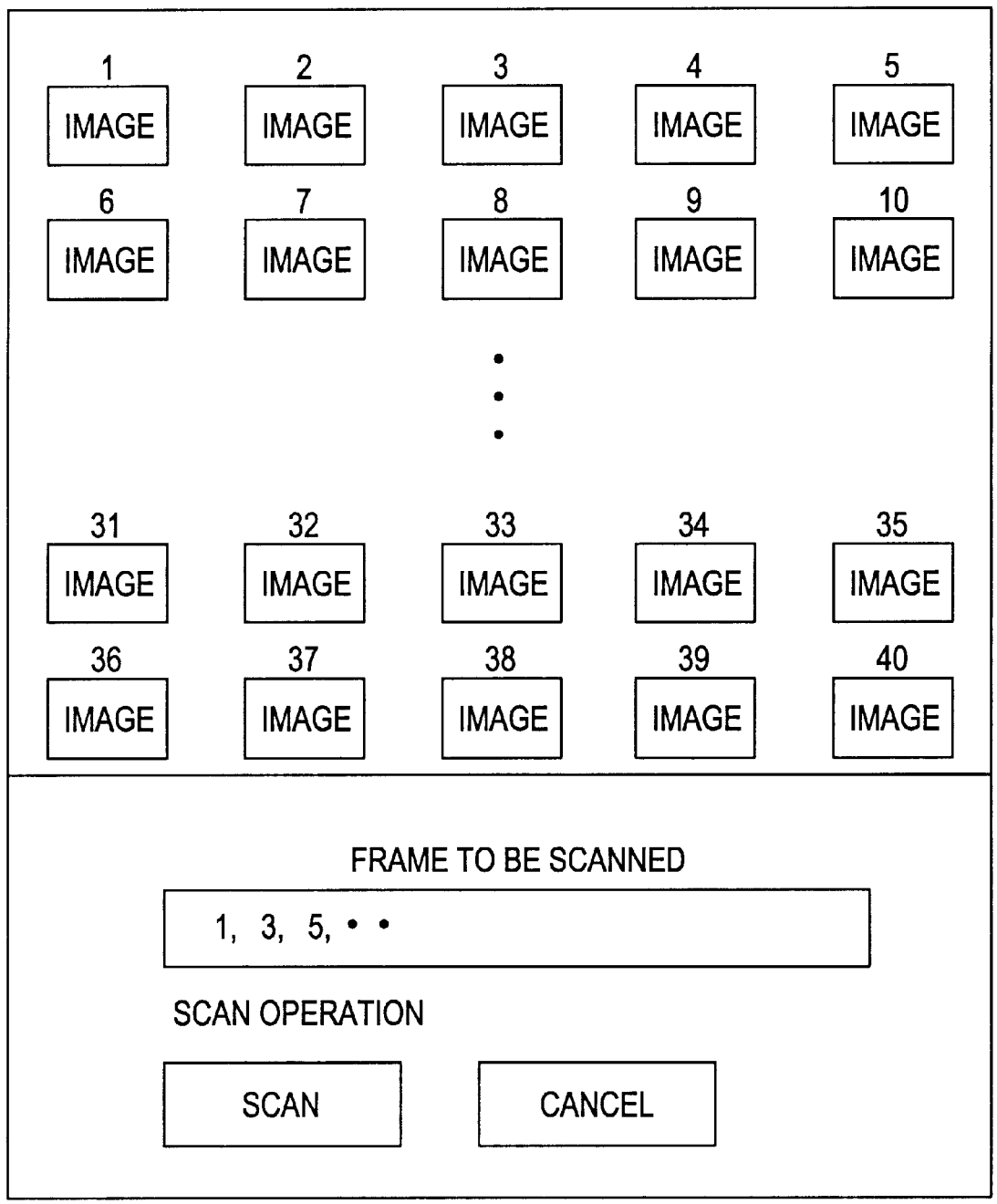
FIG. 27 is a diagram describing an example display of an image only index display screen.
Figure 28:
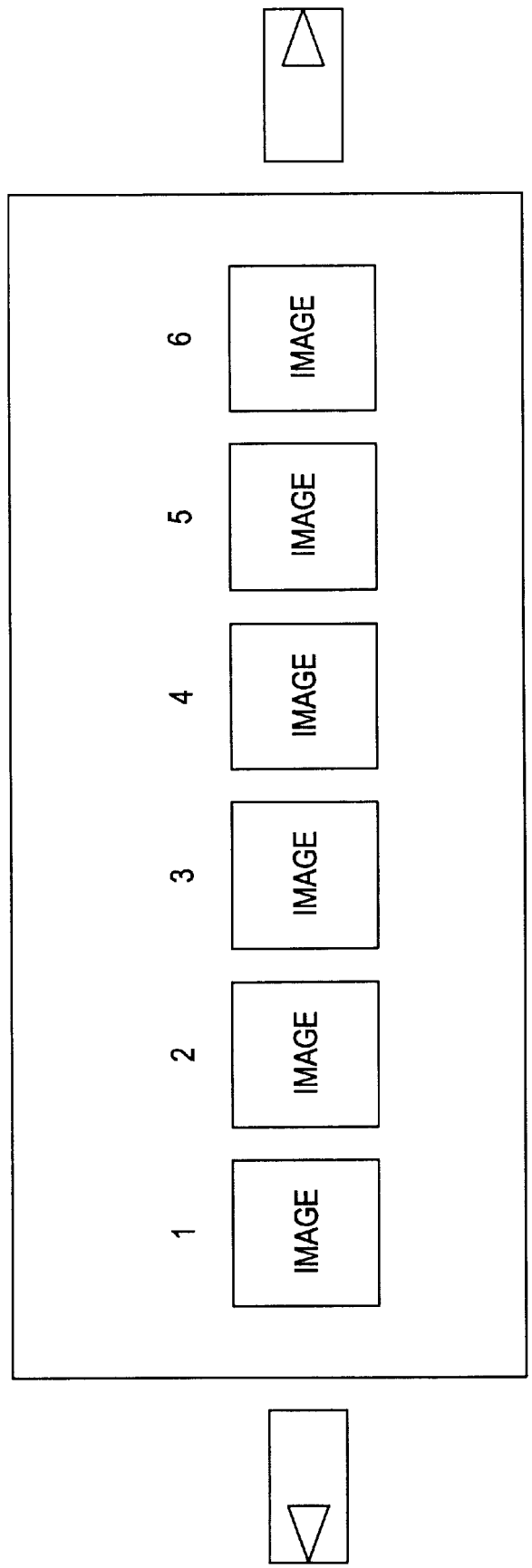
FIG. 28 is a diagram describing an example display of a designated frame index display screen.
Figure 29:
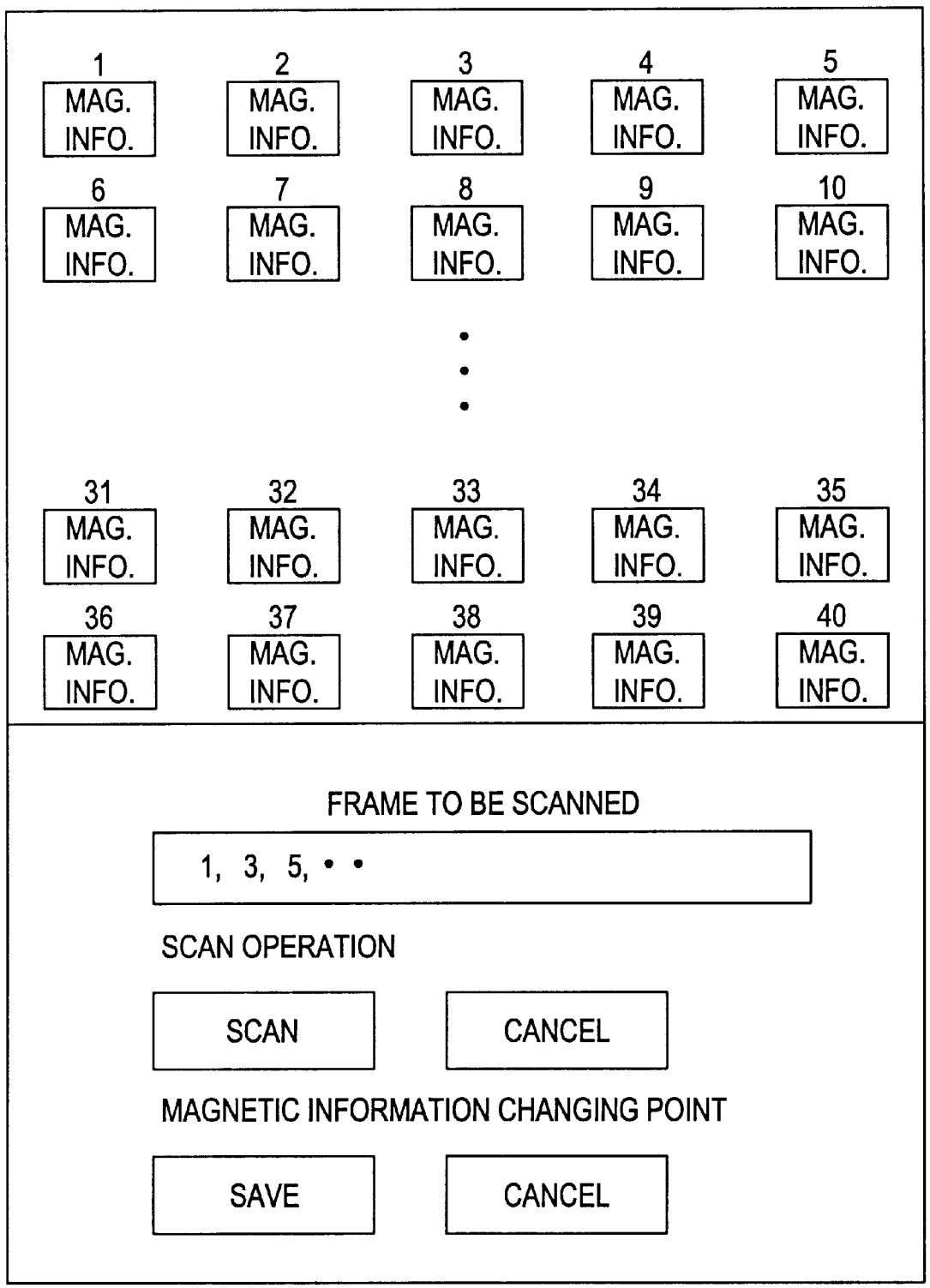
FIG. 29 is a diagram describing an example display of a magnetic information only index display screen.

FIG. 27 describes a display example of index display screen for the image. FIG. 28 describes a display example of an index display screen for a designated frame. FIG. 29 describes a display example of index display for the magnetic information. FIG. 30 describes a magnification of a frame of the index display screen for the magnetic information.

Figure 31:
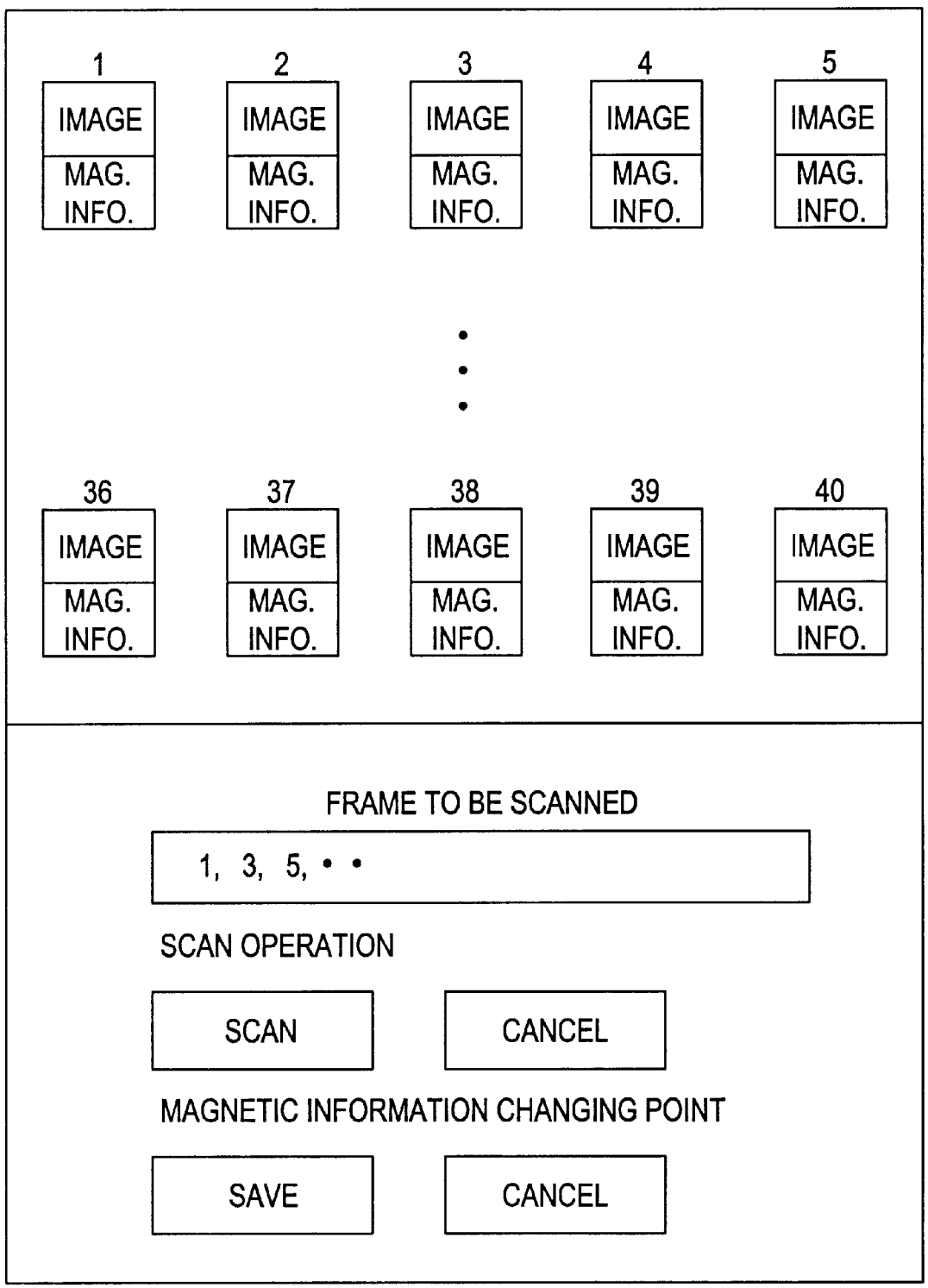
FIG. 31 is a diagram describing an example display of a magnetic information and image index display screen.
Figure 33:
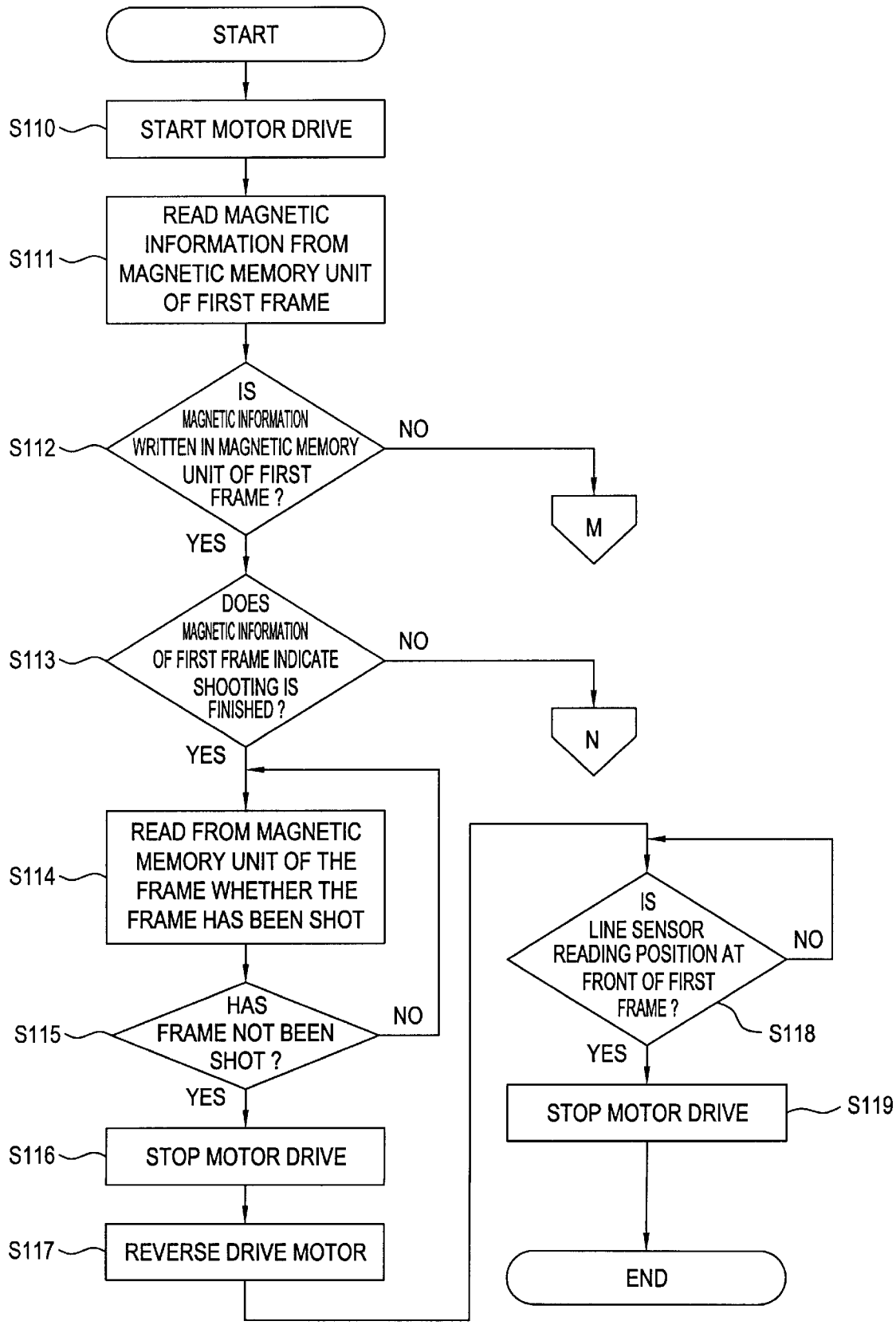
FIG. 33 is a flow chart describing a first part of the detection operation of the last frame shot.
Figure 34:
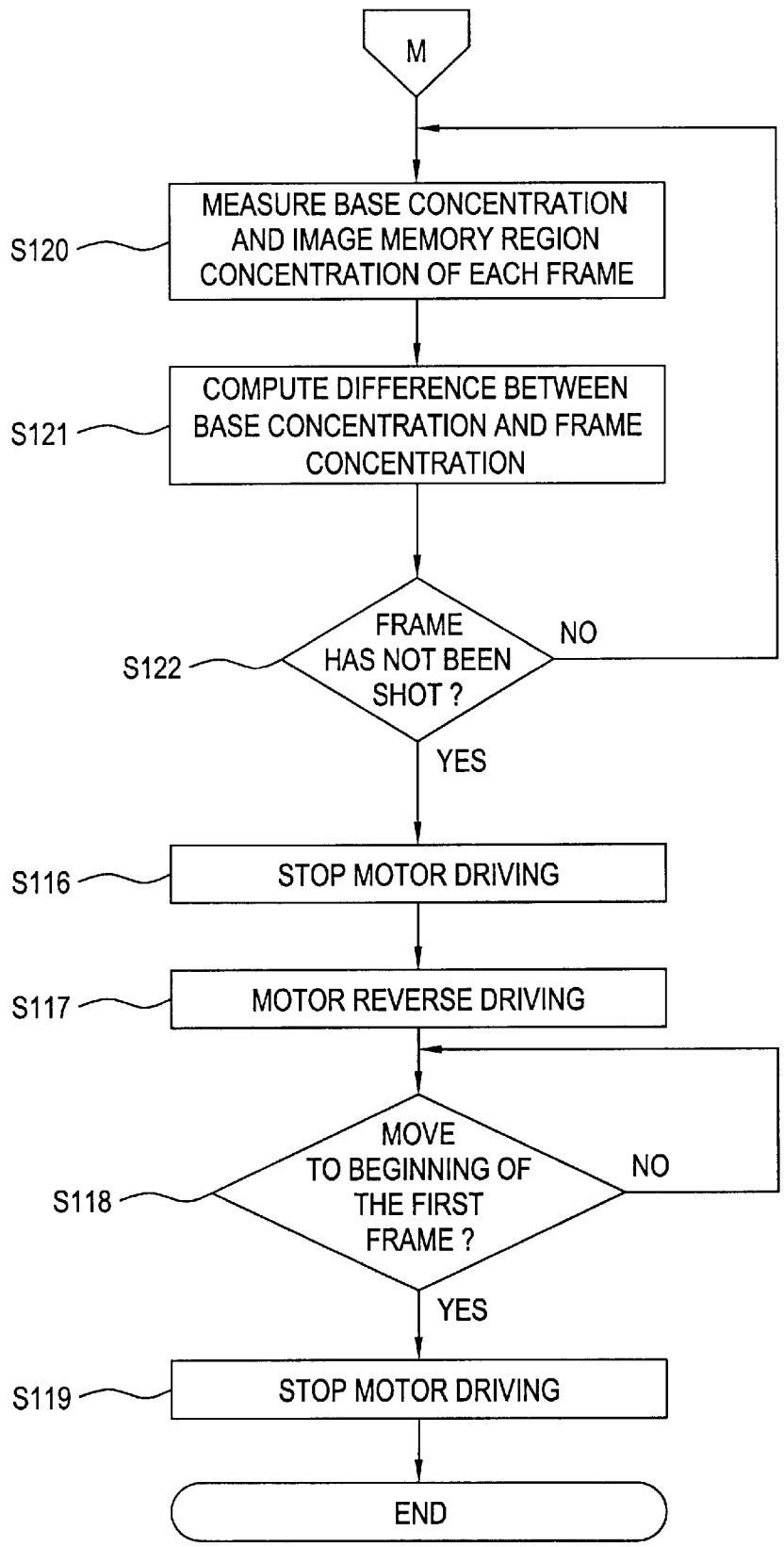
FIG. 34 is a flow chart describing a second part of the detection operation of the last frame shot.
Figure 35:
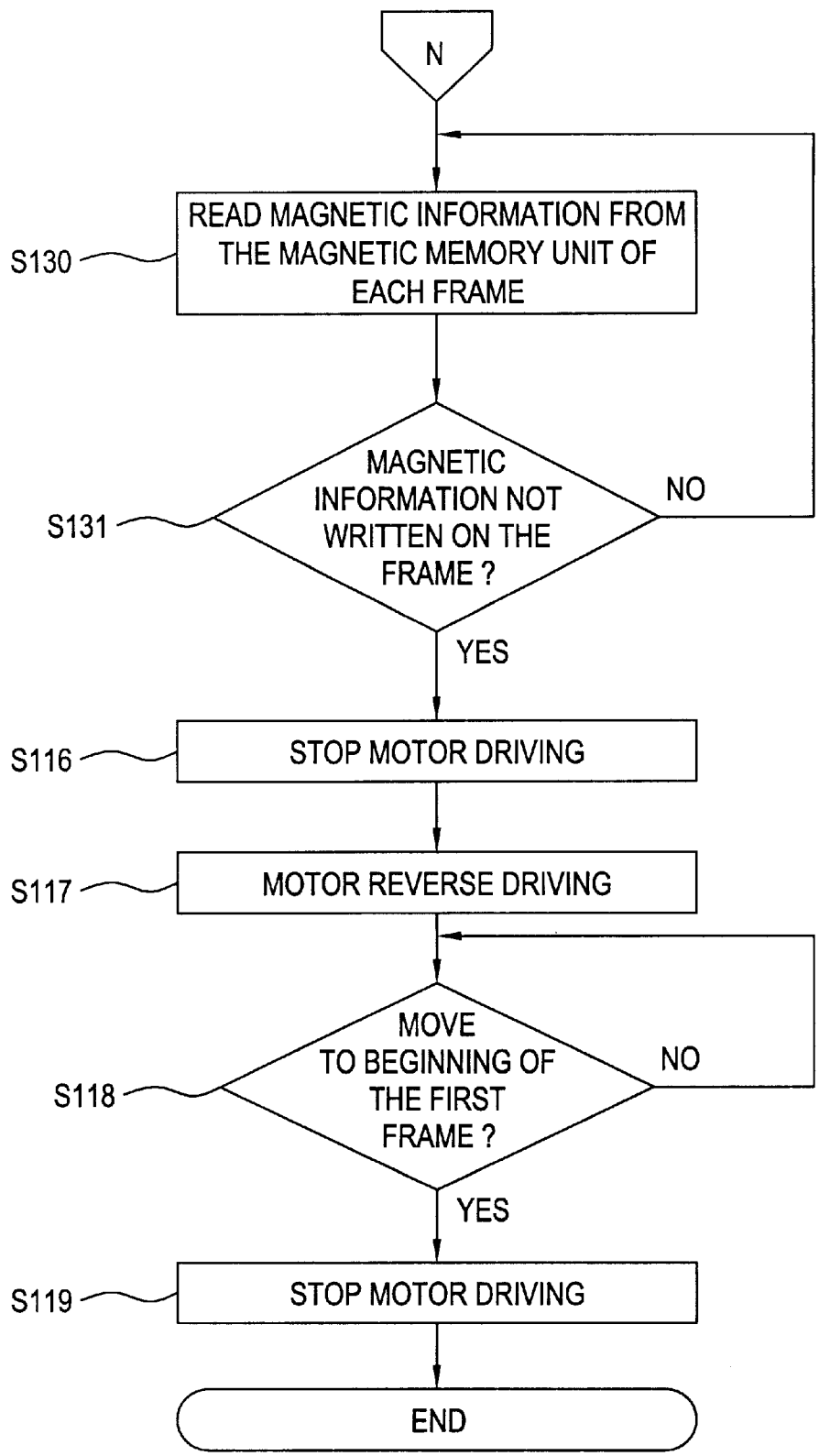
FIG. 35 is a flow chart describing a third part of the detection operation of the last frame shot.

FIG. 31 describes a display example of the image and the magnetic information. FIG. 32 describes a magnification of a frame of the index display for the image and the magnetic information. FIG. 33–FIG. 35 are flow charts describing the final detection operation of the shooting frame.

Hereafter, operation of an apparatus configured according to the present embodiment, mainly of the operation of CPU 1, will be described with reference to FIG. 3–FIG. 35.

When the cartridge 17 is mounted, CPU 1 executes initial operations in the order described in FIG. 3 and FIG. 4.

At the step S1, CPU 1 outputs to the host computer 19 transmission requests for data concerning the size and the display color number on the monitor screen, and obtains the data.

There are various sizes for monitor screen sizes such as 640×480, 800×600, 1024×768, etc. Moreover, there are various numbers of display colors such as black and white, 16 colors, 256 colors, 16.7 million colors, and so on.

At S1, CPU 1 determines the size and the display color of the monitor screen which is connected to the host computer based on the data obtained.

Next, CPU 1 extracts the selection screen data from the memory 2 at S2, and outputs the data to the host computer 19. As a result, the host computer 19 displays a selection screen such as one described in FIG. 5(a).

CPU 1 determines at S3 whether or not the data selected and set from the host computer 19 is input. If the determination at S3 is affirmative (yes), CPU 1 starts the operation of the image reading apparatus at S4.

Here, the description of the present apparatus at S4 and thereafter will be given after the explanation of the selected screen which is displayed on the monitor screen at S2.

In the selection screen, each selection choice of "automatic setting", "manual setting" and "index display" is displayed with the selection button, as described in FIG. 5(a). Moreover, the selection choice "index display" is displayed with a toggle button "display content."

Selection choice "automatic setting" and "manual setting" provide alternative options to set the parameters of the apparatus automatically or manually based on the film information.

"Manual setting" is selected, for example, when the user desires to handle the roll film 18 mounted with different specifications. "Manual setting" is also selected when the mounted roll film 18 is a new product and the corresponding film information is not provided in the apparatus. In this case, the user knows that the mounted roll film 18 is a new product.

Figure 5B:
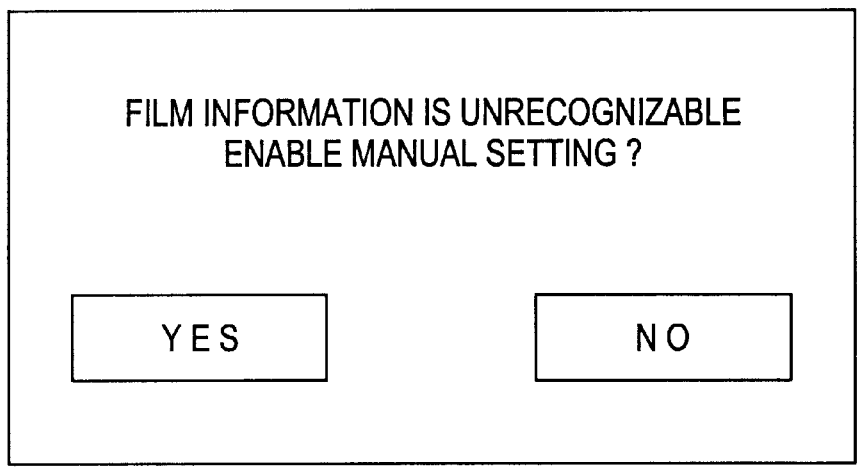
FIG. 5(b) is a drawing describing the selection screen of FIG. 5(a) after the initial operation.

Another example of when the choice "manual setting" is made is when the mounted roll film 18 is an unknown product. This is detected at S7 and is explained later. In this case, a statement, "film information cannot be recognized", for example, is displayed in the selection screen as illustrated in FIG. 5(b). The option of "manual setting" may be selected after seeing this display.

The selection of "index display" allows choice of whether the index is displayed. The selection of "index display" may be made by operation of the mouse on the toggle button "index content."

With the operation of the mouse, the index display setting screens described in FIG. 8–FIG. 10 are displayed. The index display setting screen data is the data output by CPU 1 to the host computer 19 as part of selection choice screen data.

The user may set the contents of the index display by selecting and setting the following options in the index display setting screen. To set the contents of the index display as default values, "initial setting," which is located in the last line of the screen, may be selected (see FIG. 10). The default value may be set arbitrarily by the user.

In the index display setting screen, there are general selection choices of "magnetic information only display" and "image only display" as described in FIG. 8. When both are selected, "magnetic information and image display" is enabled.

Moreover, as described in FIG. 8–FIG. 10, (1.) common choice, (2.) designated frame magnetic information choice, and (3.) designated frame image choice are individual selection choices.

There are six options in (1.) common choice. They are (1-1) the frame to be displayed; (1-2) the order of display; (1-3) the vertical-to-horizontal ratio of display; (1-4) the display method; (1-5) the simultaneous display method of the magnetic information and the image; and (1-6) high speed display.

In option (1-1) the frame to be displayed, the frame is selected and set from the group "all frames", "all frames that are shot", "selection frame", "H size only", "C size only", "P size only", "horizontal position only", and "vertical position only". "[S] election frame" is selected from the table in the screen. The frame number of the frame selected is displayed in the column under "frame selected."

In option (1-2) the order of display, there are five options: "from the first frame to the last frame in order", "from the last frame to the first frame in reverse order", "in the order of selection", "in the order of print size," and "in the order of title."

In the option "the first frame to the last frame in order," the frames are displayed in ascending order of the frame number. In the option "from the last frame to the first frame in reverse order", the frames are displayed in descending order of the frame number.

In the option "in the order of selection," the frames selected are displayed according to the order of selection. In the option "in the order of print size," frames are displayed in the order of, for example, size H, C, P when the print sizes H, C, P are designated as 1.H, 2.C and 3.P.

In the option "in the order of title," frames are displayed in the order of the tittle stored in the magnetic memory unit of each frame. The images with the same content such as sports day and field trip are sorted out and displayed. Hence, the index images become very easy to observe in this option.

Next, in option 1-3 the vertical-to-horizontal ratio of display, the user may set the number of frames in vertical display and the number of frames in horizontal display.

In the option 1-4 the display method, one of four display patterns described in FIG. 9 may be selected.

In option 1-5, the simultaneous display method of the magnetic information and the image, one method may be selected from five display methods described in FIG. 9. One of the display methods first displays image only. If the display altering button 31 located in the corner of the display screen is selected with the mouse under this display method, the display is switched to show magnetic information.

In option 1-6, the high speed display, the number of frames to be displayed in the screen is set. For example, if the user specifies six frames, the first six frames of the frames selected in "selection frame" are displayed as described in FIG. 28. Moreover, if the left and right buttons are selected by the mouse as described in FIG. 28, the next six frames in the left or the right are scrolled and displayed.

In this display, only the designated frame number is displayed. Hence, the high speed display is enabled. Moreover, the designated frame number is displayed while scrolling. Hence, this display does not interfere with other displays.

Moreover, if the high speed display is selected, CPU 1 needs only to read the designated frames. Hence, CPU 1 is able to quickly generate index display data at high speed.

Next, in option (2) the magnetic information of the designated frame, (2-1) the display information is provided. The user may select to display all or selective parts of the display information. In order to display the display information selectively, the user selects the right arrow button with the mouse.

Then, the setting screen changes to the selection screen which displays the title, shooting data, shooting conditions (existence of strobe, exposure, etc.) and the like. The user may set the desired display in the selection screen.

Next, in option (3.) designated frame image, there are four options; (3-1) display range, (3-2) resolution of one frame, (3-3) reading method, and (3-4) color decomposition.

In (3-1) display range, the range of each frame to be displayed is set. Setting may be provided from "total range", "designated print size", "H size", "C size", and "P size." "H size", "C size", "P size," etc. are stored in the magnetic memory unit 27. "Designated print size" is set by inputting from the keyboard the pixels of the display range (X1, Y1) and (X2, Y2).

In (3-2) resolution of one frame, the resolution of the image to be displayed may be designated. In (3-3) reading method, either "high speed reading" or "high quality reading" may be selected.

If "high speed reading" is selected, CPU 1 reads the designated frame with accumulation time, stop and constant gamma characteristic of the line sensor 12 based on type and model of the film and concentration (base concentration of the film base material).

Here the base concentration may be found from film information. However it is an approximate value. In the configuration of the present embodiment, the base concentration is measured during initial operation and correction is made if necessary.

If "high quality reading" is selected, CPU 1 computes optimum accumulation time, stop and gamma characteristics for each designated frame. CPU 1 reads each designated frame with the conditions specified above.

In (3-4) color decomposition, either "RGB decomposition display" or "CMY decomposition display" may be selected.

The user selects the "OK" button after verifying the contents of these selections and settings. The host computer 19, responding to the operation of the "OK" button, outputs data with contents selected and set by the user to IF circuit 3.

Here at S3, CPU 1 determines if selection/setting data has been entered from IF circuit 3. If the selection/setting data has been entered from IF circuit 3, CPU 1 determines affirmative (YES). On the other hand, if the selection/setting data has not been entered, CPU 1 determines negative (NO).

CPU 1 returns to S3 if the determination is negative (NO) at S3. CPU 1 waits for completion of selection/setting operation, described above by the user. Furthermore as soon as the selection/setting data is entered from IF circuit 3, CPU 1 determines affirmative (YES) and moves to step S4. CPU 1 starts the rotation drive of the motor 16, which in turn begins thrust operation.

At step S5, CPU 1 determines if the front section of the film has reached the reading range of the line sensor 12. This determination is made based on the output from the medium position detection sensor 13.

CPU 1 makes an affirmative determination (YES) if the front section of the film reaches reading range of the line sensor 12. On the other hand, CPU 1 makes a negative (NO) determination if the front section of the film has not reached the reading range of line sensor 12.

If the determination is negative (NO) at S5, CPU 1 returns to S5. CPU 1 waits for the front section of the film to reach reading range of the line sensor 12. When the determination at S5 becomes affirmative (YES), CPU 1 moves to the process at S6.

At S6, CPU 1 measures the base concentration of the film according to output signals of the line sensor 12, the purpose of which was explained above.

Moreover, at S7, CPU 1 reads the contents (film information) of bar code 24 or the magnetic memory of units 21, 23 of the lead section based on output from the optical information reading sensor 14 or from the magnetic head 15.

CPU 1 recognizes if the film information of the roll film 18 which is read at S7 may be used as criteria in obtaining accumulation time, stop and gamma characteristics of the line sensor 12.

At S8, CPU 1 determines whether or not the film information of the roll film 18 which is read at S7 is recognizable. For example if the roll film 18 is a new product and the apparatus does not have film information for the film, CPU 1 makes a determination of unrecognizable film information.

At S8, CPU 1 makes an affirmative (YES) determination if the film information is unrecognizable. At S9 CPU 1 generates and outputs to the host computer 19 display data such as "film information is unrecognizable" etc. As a result, the host computer 19 displays a selection screen, for example, like one described in FIG. 5(b) on the monitor screen.

CPU 1 outputs the statement "film information is unrecognizable. Proceed with manual setting?" if CPU 1 is unable to execute automatic setting because film information is unrecognizable, which will be explained later in detail.

In the selection screen of FIG. 5(b) the user operates the "YES" button or "NO" button. The host computer 19 notifies the choice of the user to CPU 1. Upon receiving the notification, CPU 1 either changes or maintains the choice made in selection screen of FIG. 5(a).

For example, if the user selects the "YES" button in the selection screen of 5(b) while automatic setting is selected in the selection screen of FIG. 5(a) the automatic selection may be changed to manual setting. On the other hand, if the user selects the "NO" button in the selection screen of FIG. 5(b) while automatic setting is selected in the selection screen of FIG. 5(a) the automatic setting will be maintained.

Upon completion of S9, CPU 1 moves to S10. CPU 1 also moves to S10 if the determination in prior step S8 is negative (NO). At S10, CPU 1 determines whether or not the reading range of the line sensor 12 has reached a location just before first frame. This determination is accomplished according to output from the medium position detection sensor 13.

CPU 1 makes a negative (NO) decision if the reading range of the line sensor 12 has not reached the location just before first frame. On the other hand, CPU 1 makes an affirmative (YES) determination if the reading range of the line sensor 12 has reached the location just before first frame.

If the determination in S10 is negative (NO), CPU 1 returns to the process of S10. CPU 1 waits for the reading range of the line sensor 12 to reach the location just before first frame.

When the determination at S10 becomes affirmative (YES), CPU 1 stops driving of the motor 16 at the next step S11 and completes the thrust operation. Then CPU 1 determines whether or not automatic setting of film information is selected at S12.

CPU 1 makes an affirmative (YES) determination if the automatic setting of film information is selected. On the other hand, CPU 1 makes a negative (NO) determination if the automatic setting of film information is not selected.

If the determination at S12 is affirmative (YES), CPU 1 determines whether or not film information is unrecognizable at the next step S13. This process reconfirms the determination of S8. If the film information is unrecognizable, CPU 1 makes the affirmative (YES) determination. On the other hand, if the film information is recognizable, CPU 1 makes the negative (NO) determination.

If the determination is affirmative (YES) at S13, CPU 1 completes the initial operation because automatic setting process cannot be executed. On the other hand, if the determination is negative (NO) at S13, CPU 1 moves to S14 because automatic setting process can be executed.

At S14, CPU 1 outputs automatic setting screen data to the host computer 19. As a result, film information automatic setting screen such as one in FIG. 6 is displayed on the monitor screen.

In the film information automatic setting screen, film type, film model, total number of frames and the like are displayed as described in FIG. 6. This display is for user verification.

Moreover, CPU 1 sets at S15 each parameter of the apparatus to optimal condition of image reading based on film information read and film concentration measured, and moves to S19. These parameters are accumulation time, stop gamma characteristics and the like of the line sensor 12. Contents of the setting will be explained later.

On the other hand, if the determination is negative (NO), at S12, CPU 1 moves to S16. At S16, CPU 1 outputs manual setting screen data to the host computer 19. As a result, film information manual setting screen such as the one described in FIG. 7 is displayed on the monitor screen. Contents of the manual setting screen are film type, film model, total frame number and the like as in the case of film information automatic setting screen. In the film information manual setting screen both buttons "OK" and "CANCEL" are displayed together.

From the keyboard the user inputs film type, film model, total number of frames and the like in the film information manual setting screen. The user selects the "OK" button if the user desires to complete the setting and then executes the image reading apparatus execute parameter setting operation. On the other hand, if the user needs to execute resetting by canceling the contents of the setting, the user selects the cancel button.

The host computer 19 responds to user operation of "OK" button and outputs the data representing manual setting by the user to IF circuit 3.

CPU 1 determines at S17 whether the data manual set above by the user is entered. If the manually set data is not entered, CPU 1 makes a negative (NO) determination. On the other hand, if the manually set data is entered, CPU 1 makes an affirmative (YES) determination.

If the determination is negative (NO) at S17, CPU 1 returns to S17. CPU 1 waits for manually set data discussed above by the user to be entered. When the determination of S17 becomes affirmative (YES), CPU 1 executes S18 and moves to S19.

At S18, CPU 1 sets each parameter of the image reading apparatus to an optimum condition for reading the image, based on manually set film information and measured film concentration. These parameters are accumulation time, stop, gamma characteristics and the like of the line sensor 12 as described before. Contents of the setting will be explained later.

At S19, CPU 1 determines whether or not the index display is selected in the selection screen described in FIG. 5(a). If the index display is selected, CPU 1 makes an affirmative (YES) determination. On the other hand, if the index display is not selected, CPU 1 makes a negative (NO) determination.

If the determination at S19 is affirmative (YES), CPU 1 performs the operations of generating data for index display screen, described in FIGS. 15–22. On the other hand, if the determination at S19 is negative (NO), CPU 1 completes the initial operation and goes into standby mode.

The explanation of data generation operation of index display screen (FIGS. 15–22) will be given after explanation of parameter setting contents at S15 and S18.

FIG. 11 is a diagram describing the relationship between exposure amount and base concentration of a negative film. In FIG. 11, the horizontal axis represents exposure amount (lux×sec.), while the vertical axis represents base concentration. FIG. 11 shows characteristic curves of exposure amount versus base concentration for each of R, G and B.

In general, in the image reading apparatus, the gamma characteristic curve is set as a curve which linearly corrects the characteristic curve of exposure amount versus base concentration. The characteristic curve of exposure amount versus base concentration of the film differs by film models. In other words, film X of company A and film Y of company B describe different characteristic curves of exposure amount versus base concentration. The film model data is contained in film information stored in the magnetic memory unit or bar code provided in the lead unit of the film.

Hence, the gamma characteristic curve needs to be set for each film model according to the film model read from film information.

On the other hand, base concentration can vary even if the film models are the same. Hence, characteristic curves of exposure amount versus base concentration often shift vertically. For this reason, when using the same model film, the gamma characteristic curve needs to be set to the optimum curve, by measuring base concentration and by correcting dispersion amount for each film.

Reading of images for index display is executed with high speed under constant gamma characteristics. Hence, in reading image for index display, all the frames are read with the gamma characteristics which are set according to above method.

Initial values for the image reading in general are the gamma characteristics which are set according to above method. Hence, in a normal image reading of all the frames, the gamma characteristics set according to above method are used as long as the characteristics are not changed.

Next, the exposure amount of the line sensor 12 depends on the accumulation time and the stop of the line sensor 12 which is controlled by CPU 1. In a normal image reading operation, the concentration distribution is measured for each frame through an operation such as pre-scanning.

The exposure time of the main scanning is computed such that the output value of the brightest spot becomes the full scale of the A/D converter 8 (for example, 255 for the 8-bit A/D converter) based on the result of the measurement. The main scanning is executed with the exposure time computed above. Hence the optimum image is obtained.

FIG. 12–FIG. 14 are measurement diagrams of the concentration distribution. In FIG. 12–FIG. 14, the horizontal axis represents the output values (0–255) of the A/D converter 8, while the vertical axis represents frequency of occurrence of each value.

If the exposure time is ideal during pre-scanning, the output value of the brightest spot becomes the full scale of the A/D converter 8 as shown in FIG. 12, enabling an accurate computation of the exposure time during the main scanning. Hence an optimum image is obtained during the main scanning.

However, if the exposure time during pre-scanning is too long, the value of the bright section of the medium (section denoted by dotted lines in FIG. 13) is limited to 255 as illustrated in FIG. 13. Hence, an accurate computation of exposure time necessary for the main scanning cannot be executed.

Furthermore, if the exposure time during pre-scanning is too short, the concentration distribution becomes dense around small values as shown in FIG. 14. In this case, quantization errors become too large. Likewise, an accurate computation of exposure time necessary for the main scanning cannot be executed.

Hence, in the present invention, the optimum exposure time during pre-scanning is computed from film information and the measured base concentration, where the base is the brightest spot.

On the other hand, in the reading of the image for index display, high speed reading with constant exposure amount is executed. Here it becomes necessary to make the accumulation time and the stop of the line sensor 12 constant for all the frames.

Hence, the exposure amount of the line sensor 12 is determined such that the line sensor 12 is not saturated and an image of an appropriate brightness of the film is obtained from the characteristic curve of the exposure amount versus base concentration. A similar concept may be applied for a positive film.

Next, an operation of CPU 1 to generate and output data for an index display screen to the host computer 19 will be described with reference to FIG. 15–FIG. 22, FIG. 23–FIG. 26 and FIGS. 33–35. Also, an operation of the host computer 19 to cause the monitor screen display index displays described in FIG. 27–FIG. 32 will be explained.

The outline of the explanation is as follows. CPU 1 determines at S21 and S53 whether one of "magnetic information display" and "image display" has been selected in the index display setting screen. Based on this result, CPU 1 executes data generation operation for index display screen of image only (FIG. 15–FIG. 17), data generation operation for index display screen of magnetic information only (FIG. 18, FIG. 19) and data generation operation for index display screen of both image and magnetic information. Hereafter, each operation will be described in detail.

At the first step S21, CPU 1 determines whether the "magnetic information display" has been selected in the index display setting screen. If the "magnetic information display" is selected, CPU 1 makes an affirmative (YES) determination. In this case, different operations are executed depending on whether the "image display" is selected.

If the "magnetic information display" has not been selected, CPU 1 makes a negative (NO) determination. In this case, CPU 1 indicates that only the "image display" is selected.

If the determination at S21 is affirmative (YES), CPU 1 moves to S53 (FIG. 18). Processing at S53 will be explained later. If the determination at S21 is negative (NO), CPU 1 executes an image display data generation process described in, for example, S22–S52.

At S22, CPU 1 determines whether "all frame display" has been selected. If selected, CPU 1 makes an affirmative (YES) determination. Otherwise, CPU 1 makes a negative (NO) determination.

If the determination of S22 is affirmative (YES), CPU 1 moves to S23. If the determination at S22 is negative (NO), CPU 1 moves to S32 (FIG. 16). The process at S32 will be explained later.

At S23, CPU 1 determines whether or not the display color number of the monitor screen is in color. If the display color number of the monitor screen is in color, CPU 1 makes an affirmative (YES) determination. If the display color number of the monitor screen does not indicate color, the CPU 1 makes a negative (NO) determination.

If the determination at S23 is affirmative (YES), CPU 1 completes the process by executing a color image display data generation process for all frames in S24–S27. If the determination at S23 is negative (No), CPU 1 completes the process by executing a black and white image display data generation process for all frames in S28–S31.

The color image display data generation process of S24–S27 is executed as follows. At S24, CPU 1 begins driving rotation of the motor 16. At S25, CPU 1 reads the image of all frames in three colors R, G and B. The method of reading colors of the image will be explained later (FIG. 23(*a*), FIG. 24(*a*), FIG. 25).

At S26, CPU 1 stops driving rotation of the motor 16. At S27, CPU 1 outputs image data to be color displayed on the monitor screen to the host computer 19, with the condition set before.

On the other hand, a black and white image display data generation process at S28–S31 is executed as follows. At S28, CPU 1 begins driving rotation of the motor 16. At S29, CPU 1 reads image of all frames by G color only. The method of black and white reading of the image will be explained during the discussion of FIG. 23(*b*), FIG. 24(*b*) and FIG. 26.

At S30, CPU 1 stops driving rotation of the motor 16. At S31, CPU outputs the image data to be black and white displayed on the monitor screen to the host computer 19.

Next, at S32, CPU 1 determines whether "display of all frames that are shot" has been selected. If selected, CPU 1 makes an affirmative (YES) determination.

If the "display of all frames that are shot" has not been selected, CPU 1 makes a negative (NO) determination.

Here, the choice of "selection frame" has been selected, which indicates that the process for the designated frame being selected is to be executed.

If the determination at S32 is affirmative (YES), CPU 1 moves to S33. If the determination at S32 is negative (NO), CPU 1 moves to S44 (FIG. 17). The process at S44 will be explained later.

At S33, CPU 1 determines whether the display color number of the monitor screen is in color. If the display color number of the monitor screen is in color, CPU 1 makes an affirmative (YES) determination. If the display color number of the monitor screen does not indicate color, the CPU 1 makes a negative (NO) determination.

If the determination at S33 is affirmative (YES), CPU 1 completes the process by executing color image display data generation process for all frames which were shot. See S34–S38. Moreover if the determination at S33 is negative (No), CPU 1 completes the process by executing black and white image display data generation process for all frames which were shot. See S39–S43.

The color image display data generation process at S34–S38 is executed as follows. At S34, CPU 1 begins rotation drive of the motor 16. At S35, CPU 1 detects the number of frames shot by a method to be explained during the discussion of FIGS. 33–35. At S36, CPU 1 reads image of all the frames which were shot by three colors, R, G and B with the conditions as discussed above. The color reading method of the image will be explained during the discussion of FIG. 23(*a*), FIG. 24(*a*), and FIG. 25.

At S37, CPU 1 stops rotation driving of the motor 16. At S38, CPU 1 outputs colored image data to be displayed on the monitor screen to the host computer 19.

On the other hand, black and white image display data generation process of S39–S43 is executed as follows. At S39, CPU 1 starts rotation driving of the motor 16. At S40, CPU 1 detects the number of frames which have already been shot using a method as discussed during the description of FIGS. 33–35. At S41, CPU 1 reads images of all the frames which have been shot with only G color. The method of black and white reading of the image will be described during the discussion of FIG. 23(*b*), FIG. 24(*b*), and FIG. 26.

At S42, CPU 1 stops rotation driving of the motor 16. At S43, CPU 1 outputs black and white image data to be displayed on the monitor screen to the host computer 19.

Here at S25 and S29, and S36 and S41, CPU 1 decides the display size for each frame, based on the relationship between the number of frames to be displayed and the size of the monitor screen. Moreover, CPU 1 sets the reading resolution to optimize the display size of each frame. CPU 1 executes reading with the reading resolution established above.

As a result, the host computer, which receives output from S27, S31, S38 and S43, displays image only index screen for all the frames or, all the frames that have been shot. FIG. 27 is an example of image only index screen for all the frames.

The user may set from the keyboard the frame number in the column, "frame to be scanned" after observing the index screen, or the user may set the frame number under the column "frame to be scanned" by observing the index screen and by clicking the frame section with the mouse. If the frame number which is set in the column, "frame to be scanned" needs to be canceled, the user selects the "cancel" button.

The host computer 19, responding to the selection of the "SCAN" button by the user, gives the frame number which is set in the column "frame to be scanned" to IF circuit 3. Accordingly, CPU 1 knows the desired frame to execute main scanning.

Next, at S44, CPU 1 determines whether display color number in the monitor screen is in color in order to execute a display data generation process for a designated frame. If the display color number of the monitor screen indicates color, the CPU 1 makes an affirmative (YES) determination. If the display color number of the monitor screen does not indicate color, the CPU 1 makes a negative (NO) determination.

If the determination at S44 is affirmative (YES), CPU 1 executes a color image display data generation process for designated frame at S45–48. If the determination at S44 is negative (NO), CPU 1 executes black and white image display data generation process for designated frame at S49–S52.

The color image display data generation process at S45–48 is executed as follows. At S45, CPU 1 starts rotation driving of the motor 16. At S46, CPU 1 reads the image of the designated frame with three colors R, G and B under the condition data set before.

For example, at S46, CPU 1 moves the medium such that each selected frame reaches the reading position of the line sensor 12 based on detection signals from the medium position detection sensor 13. Moreover CPU 1 selects the frame which matches designations such as "H size only", "C size only", "P size only", "Horizontal position only" and "vertical position only." Color reading method of the image will be explained during the discussion of FIG. 23(*a*), FIG. 24(*a*) and FIG. 25.

At S47, CPU 1 stops the rotational driving of the motor 16. At S48, CPU 1 outputs the image data to be color displayed on the monitor screen of the host computer 19 with the conditions as set before.

On the other hand, the black and white image display data generation process of S49–52 is executed as follows. At S49, CPU 1 starts rotation driving of the motor 16. At S50, CPU 1 reads the image of the designated frame using only color G with the conditions which were set before. The data conditions are assumed to be the same as previously selected. Black and white reading of the image will be explained during the discussion of FIG. 23(*b*), FIG. 24(*b*) and FIG. 26.

At S51, CPU 1 stops rotational driving of the motor 16. At S52, CPU 1 outputs the image data to be black and white displayed on the monitor screen of the host computer 19, with the conditions as set before.

Here at S46 and S50, depending on the relationship between the number of designated frames and the monitor size, CPU 1 may establish reading resolution as described above, which takes the frame display size into consideration.

At S48 and S52, CPU 1 reads and outputs designated number of frames to be displayed at high speed if the data to be displayed is "high speed display". Responding to this, the host computer 19 displays on the monitor screen an index screen of the designated frame image such as the one described in FIG. 28.

Moreover, when the user operates the mouse using left and right click buttons in the screen of FIG. 28, the host computer 19 outputs to the reading apparatus, designating number of frames to be displayed next at high speed. Responding to this, CPU 1 reads and outputs designated number of frames to be displayed at high speed.

When the user operates the mouse using left and right click buttons in the screen of FIG. 28, the above operation is repeated. As a result, in FIG. 28 if the number of frames is six, then the six designated frames are displayed simultaneously each time the mouse is operated with left and right click buttons.

The user, observing the index screen, sets from the keyboard the frame number "frame to be scanned" column. The host computer 19, responding to the operation of "SCAN" button by the user, gives the frame number set in the "frame to be scanned" column to IF circuit 3. Thus, CPU 1 knows the frame for which main scanning is executed.

Here, a brief explanation about the image reading method will be given. Color reading of image to be executed at S25, S36 and S46 will use one of three methods described in FIG. 23(*a*), FIG. 24(*a*) and FIG. 25.

In FIG. 23(*a*), image reading method of one path method is described. A light source that can turn on R (red), G (green) and B (blue), interchangeably and a black and white image sensor which is a line sensor is used.

In other words, in the method described in FIG. 23(*a*), the light source is turned on for each line by switching in order from R (red) to G (green) to B (blue). One screen is read by one movement of the medium.

In FIG. 24(*a*), image reading method of one path method is described which uses a white light source and a color image sensor which is a line sensor. In other words, the color image sensor executes reading of R (red), G (green) and B (blue) for each line and one screen is read by one movement of the medium.

In FIG. 25, a method is described in which the image is read by a three-path method using a white light source, a black and white image sensor which is a line sensor, an RGB filter and its switching mechanism. Switching the RGB filter is executed every time reading of the first line to the last line is completed in the reading of one screen. Hence, in this method reading of one screen is accomplished by three movements of the medium.

Next, the black and white reading of the image executed at S29, S41 and S50 is accomplished by one of three methods described in FIG. 23(*b*), FIG. 24(*b*), and FIG. 26.

In FIG. 23(*b*), image reading method of one path method is described which uses a G (green) light source of the light source that can turn on R (red), G (green) and B (blue) interchangeably and a black and white image sensor which is a line sensor.

In other words, in the method described in FIG. 23(*b*), each line is read using G (green) light source only. Reading of one screen is completed with one movement of the medium. In the black and white reading method, switching of the light source is not executed, but only the G (green) light source is used. Hence, compared to the color reading method described in FIG. 23(*a*), high speed reading is possible.

Figure 24A:
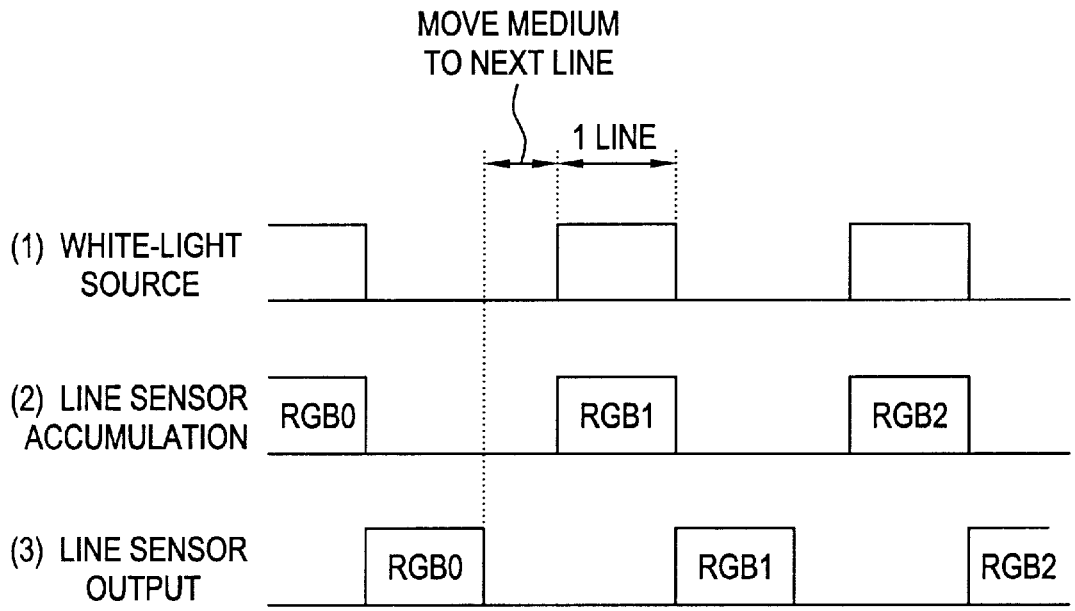
FIG. 24(a) is a time chart of the image reading by the color image sensor for color reading.
Figure 24B:
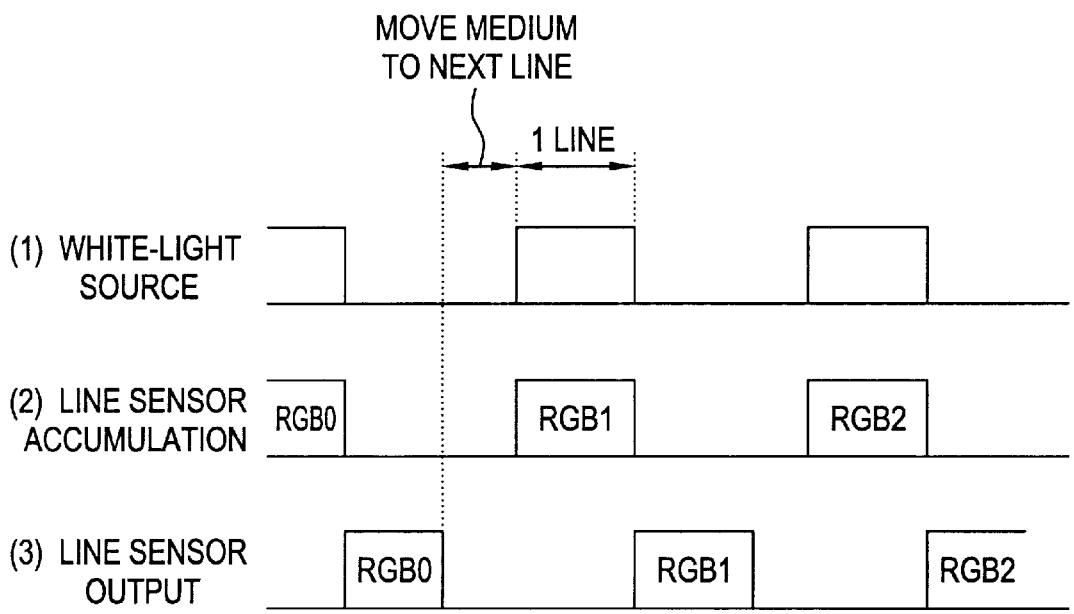
FIG. 24(b) is a time chart of the image reading by the color image sensor for black and white reading.

Similar to FIG. 24(*a*), in FIG. 24(*b*), image reading method of one path is described which uses white light source and a color image sensor which is a line sensor. In other words, the reading method described in FIG. 24(b) does not differ from color reading described in FIG. 24(a). The difference is that the data delivered to the host computer 19, is only G (green) color among the three read colors of image data.

The black and white reading method which uses color image sensor as a line sensor reduces data volume to be delivered to the host computer 19, to one third of the data volume delivered for color reading. Hence, data transfer time to the host computer 19 and the data processing time will be reduced substantially.

Therefore, reading in this method is more efficient and at a higher speed than color reading.

FIG. 26 describes the image reading method with one path using white light source, black and white image sensor which is a line sensor and G filter. The G filter is selected and used among RGB filters in the same structure as the method described in FIG. 25. Hence, reading of one screen is completed by one movement of the medium.

For this reason, the black and white reading method described in FIG. 26 enables higher speed reading than the color reading method described in FIG. 25.

Next at S53, CPU 1 determines whether or not "image display" is selected in the index display setting screen. If "image display" has been selected, CPU 1 makes an affirmative (YES) determination. In this case both "magnetic information display" and "image display" are being selected.

If the "image display" is not selected, CPU 1 makes a negative (NO) determination. In this case "display of magnetic information only" has been selected.

If the determination at S53 is affirmative (YES), CPU 1 moves to S69. The process of S69 will be described during the discussion of FIG. 20. On the other hand, if the determination at S53 is negative (NO), CPU 1 executes display data generation process of magnetic information only at S54–68.

At S54, CPU 1 determines whether "all frame display" is selected. If "all frame display" is selected, CPU 1 makes an affirmative (YES) determination. If "all frame display" is not selected, CPU 1 makes a negative (NO) determination.

If the determination at S54 is affirmative (YES), at S55–58, CPU 1 executes magnetic information display data generation process of all the frames and the present process is completed. On the other hand, if the determination at S54 is negative (NO), CPU 1 moves to the process of S59. The process of S59 will be explained during the discussion of FIG. 18.

The magnetic information display data generation process for all the frames at S55–58 is executed as follows. At S55, CPU 1 starts rotational driving of the motor 16. At S56, CPU 1 reads magnetic information of all the frames under the conditions set before.

At S57, CPU 1 stops rotational driving of the motor 16. At S58, CPU 1 outputs to the host computer 19, magnetic information data to be displayed on the monitor screen with the conditions set before.

As a result, host computer 19 displays an index screen of magnetic information only on the monitor screen, such as one described in FIG. 29. The user, observing the index screen, can use the keyboard to set the frame number in the "frame to be scanned" column.

Moreover, the user can set the frame number in the "frame to be scanned" column, by selecting the section of the frame to be scanned with the mouse.

The host computer 19, in response to user's operation of the "SCAN" button, gives the frame number which is set in the "frame to be scanned" column, to IF circuit 3. By this process, CPU 1 knows the frame for which main scanning is to be executed.

As described in FIG. 30, by selecting an arbitrary frame, the user can magnify and display the magnetic information display of the frame. The contents of the magnetic information are title, date of shooting, shooting conditions and the like. Shooting conditions include whether a strobe is used, whether light is reversed, types of light sources and the like. Verification of these choices becomes as easy as a result of magnified display.

Moreover, the user can add corrections or additions to the contents of magnetic information, using a mouse and keyboard. This altering operation becomes easier by the magnification display described above. Contents of alterations are maintained in the host computer 19, by operation of the "store" button described in FIG. 29. The host computer 19 gives the contents of the alteration to IF circuit 3. Through this process, CPU 1 learns of the alterations to the magnetic information.

Next, at S59, CPU 1 determines whether or not "display of all the frames which are shot" is selected.

If selected, CPU 1 makes an affirmative (YES) determination.

If the "display of all the frames which are shot" is not selected, CPU 1 makes a negative (NO) determination. In this case "selection frame" is selected. This indicates that the process for a selected designated frame is being executed.

If the determination at S59 is affirmative (YES), CPU 1 completes the present operation by executing the magnetic information display data generation process for the frames which were shot at S60–64. On the other hand, if the determination at S59 is negative (NO), CPU 1 completes the present operation by performing the magnetic information display data generation process for the designated frames of S65–S68.

The magnetic information display data generation process for the frames which have been shot is executed as follows at S60–64. At S60, CPU 1 starts rotation driving of the motor 16. At S61, CPU 1 detects the number of frames which have been shot using a method to be explained during the discussion of FIGS. 33–35.

At S62, CPU 1 reads magnetic information of all the frames which have been shot with the conditions set before. At S63, CPU 1 stops the rotation driving of the motor 16. At S64, CPU 1 outputs to the host computer 19, magnetic information data to be displayed on the monitor screen with the conditions set before.

As a result, the host computer 19 displays on the monitor screen magnetic information of the frames which have been shot. In this case, the display format is the same as the display format of the image of the frames which have been shot. See FIG. 27. Moreover, magnified display and alterations such as corrections and additions are possible.

On the other hand, the magnetic information display data generation process for the designated frames is executed as follows in S65–68. At S65, CPU 1 starts rotation driving of the motor 16. At S66, CPU 1 reads magnetic information of the designated frames with the conditions which were set before. At S67, CPU 1 stops rotation driving of the motor 16. At S68, CPU 1 outputs the magnetic information data to the host computer 19, to be displayed on the monitor screen with the conditions which were set before.

As a result, the host computer 19 displays on the monitor screen magnetic information of the designated frame. In this case, the display format is the same as the display format of the designated frame image. See FIG. 28. Moreover, magnified display and alterations such as, corrections and additions are possible.

Next, display data generation processes applied when both "magnetic information display" and "image display" are selected will be discussed with reference to FIGS. 20–22.

At S69, CPU 1 determines whether "all frame display" is selected. If "all frame display" is selected, CPU 1 makes an affirmative (YES) determination. If "all frame display" is not selected, CPU 1 makes a negative (NO) determination.

If the determination at S69 is affirmative (YES), CPU 1 moves to S70. On the other hand, if the determination at S69 is negative (NO), CPU 1 moves to S79. See FIG. 21. The process at S79 will be explained later.

At S70, CPU 1 determines whether or not the display color number on the monitor screen is in color. If the display color number on the monitor screen is in color, CPU 1 makes an affirmative (YES) determination. If the display color number on the monitor screen does not indicate color, CPU 1 makes a negative (NO) determination.

If the determination at S70 is affirmative (YES), CPU 1 completes the present process by executing the color display data generation process at S71–74. On the other hand if the determination at S70 is negative (NO), CPU 1 completes the present process by executing the black and white display data generation process at S75–78.

Color display data generation process at S71–74 is executed as follows. At S71, CPU 1 starts the rotation driving of motor 16. At S72, CPU 1 reads magnetic information and images of all the frames with three colors R, G and B, with the conditions which were set before.

At S73, CPU 1 stops the rotation driving of the motor 16. At S74, CPU 1 outputs to the host computer 19, magnetic information and image data to be color displayed on the monitor screen, with the conditions which were set before.

Black and white display data generation process at S75–78 is executed as follows. At S75, CPU 1 starts the rotation drive of the motor 16. At S76, CPU 1 reads magnetic information and images of all the frames with only G color, with the conditions which were set before. At S78, CPU 1 outputs to the host computer 19, magnetic information and image data to be displayed in black and white on the monitor screen, with the conditions which were set before.

As a result, the host computer 19 displays on the monitor screen an index screen in which magnetic information and images for each frame is combined, such as the one described in FIG. 31.

The user, observing the index screen, can set from the keyboard the frame number in the "frame to be scanned" column. Moreover, the user can set the frame number in the "frame to be scanned" column, by clicking the section of frame to be scanned with the mouse by observing the index screen.

The host computer 19, in response to user's operation of the "SCAN" button, gives the frame number which is set in the "frame to be scanned" column to IF circuit 3. By this process, CPU 1 knows the frame for which main scanning is to be executed.

As described in FIG. 32, by clicking an arbitrary frame, the user can magnify and display the magnetic information display of the frame. The contents of the magnetic information are title, date of shooting, shooting conditions and the like. Shooting conditions include whether a strobe is used, whether light is reversed, types of light sources and the like.

Moreover, the user can add corrections or additions to the contents of magnetic information, using a mouse and keyboard. This altering operation becomes easier by the magnification display described above. Contents of alterations are maintained in the host computer 19 by operation of the "store" button. The host computer 19 gives the contents of the alteration to IF circuit 3. Thus, CPU 1 learns of the alterations to the magnetic information.

Next, at S79, CPU 1 determines whether "display of all the frames which are shot" is selected. If the "display of all the frames which are shot" is selected, CPU 1 makes an affirmative (YES) determination.

If the "display of all the frames which are shot" is not selected, CPU 1 makes a negative (NO) determination. In this case "selection frame" is selected. This indicates that the process for selected designated frame is being executed.

If the determination at S79 is affirmative (YES), CPU 1 moves to the process at S80. If the determination at S79 is negative (NO), CPU 1 moves to the process at S91. See FIG. 22. The process at S91 will be explained later.

At S80, CPU 1 determines whether the display color number on the monitor screen is in color. If the display color number on the monitor screen indicates color, CPU 1 makes an affirmative (YES) determination. If the display color number on the monitor screen does not indicate color, CPU 1 makes a negative (NO) determination.

If the determination at S80 is affirmative (YES), CPU 1 completes the present process by executing the color display data generation process at S81–85. On the other hand if the determination at S80 is negative (NO), CPU 1 completes the present process by executing the black and white display data generation process at S86–90.

Color display data generation process at S81–85 is executed as follows. At S81, CPU 1 starts the rotation driving of motor 16.

At S82, CPU 1 detects the number of frames which have been shot by a method to be explained during the discussion of FIGS. 33–35. At S83, CPU 1 reads the magnetic information of all the frames which were shot with the conditions set before, and reads the images of all the frames which were shot with three colors RGB. At S84, CPU 1 stops rotation driving of the motor 16. At S85, CPU 1 outputs to the host computer 19, magnetic information and image data to be color displayed on the monitor screen, with the conditions which were set before.

Black and white display data generation process at S86–90 is executed as follows. At S86, CPU 1 starts the rotation driving of motor 16. At S87, CPU 1 detects the number of frames which have been shot by a method to be explained during the discussion of FIGS. 33–35. At S88, CPU 1 reads the magnetic information of all the frames which were shot with the conditions set before, and reads the images of all the frames which were shot with G color only.

At S89, CPU 1 stops rotation driving of the motor 16. At S90, CPU 1 outputs to the host computer 19 magnetic information and image data to be displayed in black and white on the monitor screen, with the conditions which were set before.

As a result, the host computer 19 displays on the monitor screen magnetic information and the image of each frame with a similar format as the one described above. The user is able to execute operations similar to the operations stated before.

Next at S91, CPU 1 determines whether the display color number on the monitor screen is in color in order to execute display data generation process of the designated frame. If the display color number on the monitor screen is in color, CPU 1 makes an affirmative (YES) determination. If the display color number on the monitor screen is not in color, CPU 1 makes a negative (NO) determination.

If the determination at S91 is affirmative (YES), CPU 1 completes the present process by executing the color display data generation process at S92–95. On the other hand if the determination at S91 is negative (NO), CPU 1 completes the present process by executing the black and white display data generation process at S96–99.

The color display data generation process at S92–95 is executed as follows. At S92, CPU 1 starts the rotation driving of motor 16. At S93, CPU 1 reads the magnetic information of designated frames with the conditions which were set before, and reads the image of designated frames with three colors RGB. At S94, CPU 1 stops rotation driving of the motor 16. At S95, CPU 1 outputs to the host computer 19, magnetic information and image data to be color displayed on the monitor screen, with the conditions which were set before.

The black and white display data generation process at S96–99 is executed as follows. At S96, CPU 1 starts the rotation driving of motor 16. At S97, CPU 1 reads the magnetic information of designated frames with the conditions which were set before, and reads the image of designated frames, with G color only. At S98, CPU 1 stops rotation driving of the motor 16. At S99, CPU 1 outputs to the host computer 19, magnetic information and image data to be displayed in black and white on the monitor screen, with the conditions as set before.

As a result, the host computer 19 displays on the monitor screen magnetic information and the image of each designated frame with a similar format as the format described above. The user is able to execute operations similar to the ones stated before.

Here, image reading at S72, S76, S83, S88, S93 and S97 is executed by the method described in FIGS. 23–26. Moreover, as discussed before, the reading resolution is set by considering the relationship between display frame number and monitor size.

Next, the final detection operation of the frames which have been shot is executed as follows and is described in FIGS. 33–35. To begin with at S110, CPU 1 starts rotation driving of the motor 16. Next, at S111, CPU 1 reads the magnetic information, in the magnetic memory unit 27 of the first frame. CPU 1 determines at S112 whether magnetic information is written in the magnetic memory unit 27 of the first frame.

In other words, CPU 1 determines whether magnetic information was read from the magnetic memory unit 27 of the first frame. If magnetic information has been written on the magnetic memory unit of the first frame, CPU 1 makes an affirmative (YES) determination. If magnetic information has not been written on the magnetic memory unit of the first frame, CPU 1 makes a negative (NO) determination.

If the determination at S112 is affirmative (YES), CPU 1 executes the process at S113. On the other hand, if the determination at S112 is negative (NO), CPU 1 moves to the process at S120 (FIG. 34). The process at S120 will be explained later.

At S113, CPU 1 determines whether magnetic information of the first frame indicates whether shooting is finished. If the magnetic information of the first frame indicates that shooting is finished, CPU 1 makes an affirmative (YES) determination. On the other hand, if the magnetic information of the first frame does not indicate that shooting is finished, CPU 1 makes a negative (NO) determination.

If the determination at S113 is affirmative (YES), CPU 1 moves to the process at S14. If the determination at S113 is negative (NO), CPU 1 moves to the process at S130 (FIG. 35). The process at S130 will be explained during the discussion of FIG. 35.

At S114, CPU 1 reads from the magnetic memory unit 27, information indicating whether or not the frame has been shot. At S115, CPU 1 determines whether or not a frame which has not been shot is detected.

If the frame which has not been shot is detected, CPU 1 makes an affirmative (YES) determination. On the other hand, if the frame which has not been shot is not detected, CPU 1 makes a negative (NO) determination. The frame immediately preceding the frame which has not been shot is the last of the frames which have been shot.

If the determination at S115 is affirmative (YES), CPU 1 moves to S116. On the other hand, if the determination at S115 is negative (NO), CPU 1 returns to S114. CPU 1 continues detection of the frame which has not been shot.

At S116, because the frame which has not been shot was detected, CPU 1 stops rotation driving of the motor 12. Next at S117, CPU 1 drives the motor 12 by reversing the direction of the rotation.

At S118, CPU 1 determines whether the reading position of the line sensor 12 moves to the front of the first frame. If the reading position of the line sensor 12 moves to the front of the first frame, CPU 1 makes an affirmative (YES) determination. On the other hand, if the reading position of the line sensor 12 does not move to the front of the first frame, CPU 1 makes a negative (NO) determination.

If the determination at S118 is negative (NO), CPU 1 returns to S118 and waits for the reading position to move to the front of the first frame. When the determination at S118 becomes affirmative (YES), CPU 1 stops the driving of the motor 16 at S119 and completes the present process.

Shooting is generally done in order from the first frame, and shooting from the middle is not likely. Hence, if the magnetic information is not written on the magnetic memory unit 27 of the first frame, the process at S120–122 is executed and the last frame of the frames that have been shot is detected.

At S120, CPU 1 measures the base concentration and image memory region 27 of each frame of the roll of film 18. At S121, CPU 1 computes the difference between a base concentration and the concentration of each frame.

Next at S122, CPU 1 determines based on the difference value obtained, whether the frame has not been shot. If the difference obtained is nearly 0, the frame is considered to have not been shot and thus CPU 1 makes an affirmative (YES) determination. On the other hand, if the difference obtained is not close to 0, the frame is considered to have been shot and thus CPU 1 makes a negative (NO) determination.

If the determination at S122 is negative (NO), CPU 1 returns to S120 and CPU 1 again executes detection operation to detect if the frames have not been shot. Moreover, if the determination at S122 is affirmative (YES), CPU 1 completes the present process by executing the process at S116–S119, discussed above.

Next, there are films for which the magnetic information is written in the magnetic memory 27 unit of each frame when the shooting is finished. In this case, the last of the frames that have already been shot is detected by executing steps S130 and S131.

First at S130, CPU 1 reads the magnetic information from the magnetic memory unit 27 of each frame. Next at S131, CPU 1 determines whether the magnetic information is not written on the frame. If the magnetic information is not written on the frame, CPU 1 makes an affirmative (YES) determination. On the other hand, if the magnetic information is written on the frame, CPU 1 makes a negative (NO) determination.

If the determination at S131 is negative (NO) CPU 1 returns to S130 and again executes the operation to detect the frame on which magnetic information is written. If the determination at S131 is affirmative (YES), CPU 1 completes the present process by executing steps S116–119, discussed above.

The control program of the host computer 19 in the preferred embodiment described above is stored on the hard disk drive, which is a storage medium 19a. Further, the program stored on the hard disk may be stored in the storage medium 19a of a CD-ROM or the like, so that set up in the host computer 19 is possible beforehand.

The CPU 1 of the image reading apparatus may also be used in place of the central processing unit of the host computer 19. Further, a memory 2 of the image reading apparatus may be used in place of the memory of the host computer 19. In that case, a program identical to the program of the host computer 19 may be stored in the memory 2 or the like. Also, the CPU 1 of the image reading apparatus can perform program execution by reading out the program stored in the storage medium 19a or the memory 2 into the working memory.

As described above in the film image reading apparatus of embodiments of the invention, the index display setting screen data is sent to a host apparatus to have the index display setting screen displayed on the monitor screen. The index display screen data to be displayed on the monitor screen of the host apparatus is generated by taking in data from image reading means and magnetic information reading means according to setting data which is entered from the host apparatus and which is selected and set at the index display setting screen.

Here, data with various contents may be included in the index display setting screen data as described in the film image reading apparatus of the following claims. Therefore, the index screen which the user arbitrarily selects and sets may be displayed easily on the monitor screen of the host apparatus.

What is claimed is:

1. A film image reading apparatus, comprising:
   illumination means for illuminating a film medium having a plurality of image memory regions;
   image reading means for photo-electric converting light through each of the plurality of image memory regions into an image signal;
   moving means for moving at least one of the film medium and the image reading means relative to each other;
   display setting means for setting how from a plurality of possible choices, a plurality of images recorded in the plurality of image memory regions are to be simultaneously displayed; and
   display controlling means for processing the image signal based upon a setting of the display setting means to simultaneously display the plurality of images on an external display.

2. The film image reading apparatus of claim 1, wherein the film medium includes a magnetic memory region for each of the plurality of image memory regions, further comprising:
   magnetic information reading means for reading magnetic information recorded in the magnetic memory regions; and
   wherein the display setting means includes selecting means for selecting whether one or both of the magnetic information and the image of one of the plurality of image memory regions is to be displayed.

3. The film image reading apparatus of claim 1, wherein the film medium includes a magnetic memory region for each of the plurality of image memory regions, further comprising:
   magnetic information reading means for reading magnetic information recorded in the magnetic memory regions; and
   wherein the display setting means includes:
     designating means for designating an arbitrary one of the plurality of image memory regions of the film medium; and
     selecting means for selecting whether one or both of the image of the designated image memory region designated by the designating means and the magnetic information of the magnetic memory region corresponding to the designated image memory region is to be displayed.

4. The film image reading apparatus of claim 1, wherein the display setting means includes designating means for designating which of the images of the plurality of image memory regions of the film medium are to be displayed.

5. The film image reading apparatus of claim 1, wherein the film medium includes a frame number for each of the plurality of image memory regions; and
   the display setting means includes selecting means for selecting whether the images of the plurality of image memory regions of the film medium are to be displayed in order from a smallest frame number or from a largest frame number.

6. The film image reading apparatus of claim 1, wherein the display setting means includes frame number setting means for setting a number of frames to be displayed in a horizontal direction so as to display a plurality of images corresponding to the plurality of image memory regions in a matrix on the display.

7. The film image reading apparatus of claim 1, wherein the film medium includes a frame number for each of the plurality of image memory regions; and
   the display setting means includes selecting means for selecting whether the images corresponding to the plurality of image memory regions are to be displayed such that the frame numbers of the displayed images increases in a vertical direction or in a horizontal direction of the display.

8. The film image reading apparatus of claim 1, wherein the film medium includes a magnetic memory region for each of the plurality of image memory regions, further comprising:
   magnetic information reading means for reading magnetic information recorded in the magnetic memory regions; and
   wherein the display setting means includes position designating means for designating a position relationship between each image and each magnetic information when a plurality of images and the magnetic information corresponding to the plurality of images are displayed.

9. The film image reading apparatus of claim 1, wherein the display setting means includes frame number designating means for designating a number of frames of images to be initially displayed.

10. The film image reading apparatus of claim 1, wherein the display setting means includes an area designating means for designating an area as a display area in at least one of the plurality of designated image memory regions.

11. The film image reading apparatus of claim 1, wherein the display setting means includes resolution setting means for setting a resolution at which a plurality of images corresponding to the image memory regions are to be displayed.

12. The film image reading apparatus of claim 1, further comprising:

reading mode setting means for setting one of a high speed reading mode and a high quality image reading mode; and control means for controlling the image reading means based upon the setting of the reading mode setting means.

13. The film image reading apparatus of claim 1, wherein the display setting means includes color separation characteristic setting means for setting color separation characteristics of a plurality of the images corresponding to the plurality of image memory regions that are displayed.

14. A film image reading apparatus, comprising:

a light source that illuminates a film medium having a plurality of image memory regions;

a photo-electric converter that photo-electric converts light from the light source that passes through each of the plurality of image memory regions into an image signal;

a moving mechanism that moves at least one of the film medium and the photo-electric converter relative to each other;

a display selector that sets how, from a plurality of possible choices, a plurality of images recorded in the plurality of image memory regions are to be simultaneously displayed; and a display controller that processes the image signal based upon a setting of the display selector to simultaneously display the plurality of images on an external display.

15. The film image reading apparatus of claim 14, wherein the film medium includes a magnetic memory region for each of the plurality of image memory regions, further comprising:

a magnetic information reader that reads magnetic information recorded in the magnetic memory regions; and wherein the display selector also selects whether one or both of the magnetic information and the image of one of the plurality of images memory regions is to be displayed.

16. The film image reading apparatus of claim 14, wherein the film medium includes a magnetic memory region for each of the plurality of image memory regions, further comprising:

a magnetic information reader that reads magnetic information recorded in the magnetic memory regions; and wherein the display selector includes:

an image designator that designates an arbitrary one of the plurality of image memory regions of the film medium; and a type selector that selects whether one or both of the image of the designated image memory region designated by the image designator and the magnetic information of the magnetic memory region corresponding to the designated image memory region is to be displayed.

17. The film image reading apparatus of claim 14, wherein the film medium includes a frame number for each of the plurality of image memory regions; and the display selector also selects whether the images corresponding to the plurality of image memory regions are to be displayed such that the frame numbers of the displayed images increases in a vertical direction or in a horizontal direction of the display.

18. A method of reading a film image, comprising the steps of:

illuminating a film medium having a plurality of image memory regions;

photo-electric converting light that has passed through each of the plurality of image memory regions into an image signal;

moving at least one of the film medium and a photo-electric converter that performs the photo-electric converting step relative to each other;

setting how, from a plurality of possible choices, a plurality of images recorded in the plurality of image memory regions are to be simultaneously displayed; and processing the image signal based upon the setting made in the setting step to generate display data for simultaneously displaying the plurality of images on a display screen.

19. The method of claim 18, wherein the film medium includes a magnetic memory region for each of the plurality of image memory regions, further comprising the step of:

reading magnetic information recorded in the magnetic memory regions; and wherein the setting step includes selecting whether one or both of the magnetic information and the image of one of the plurality of image memory regions is to be displayed.

20. The method of claim 18, wherein the film medium includes a magnetic memory region for each of the plurality of image memory regions, further comprising the step of:

reading magnetic information recorded in the magnetic memory regions; and wherein the setting step includes the steps of:

designating an arbitrary one of the plurality of image memory regions of the film medium; and selecting whether one or both of the image of the designated image memory region designated by the designating step and the magnetic information of the magnetic memory region corresponding to the designated image memory region is to be displayed.

21. The method of claim 18, wherein the setting step includes designating which of the images of the plurality of image memory regions of the film medium are to be displayed.

22. The method of claim 18, wherein the film medium includes a frame number for each of the plurality of image memory regions; and the setting step includes the step of selecting whether the images of the plurality of image memory regions of the film medium are to be displayed in order from a smallest frame number or from a largest frame number.

23. The method of claim 18, wherein the setting step includes the step of setting a number of frames to be displayed in a horizontal direction so as to display a plurality of images corresponding to the plurality of image memory regions in a matrix on the display.

24. The method of claim 18, wherein the film medium includes a frame number for each of the plurality of image memory regions; and the setting step includes the step of selecting whether the images corresponding to the plurality of image memory regions are to be displayed such that the frame numbers of the displayed images increases in a vertical direction or in a horizontal direction of the display.

25. The method of claim 18, wherein the film medium includes a magnetic memory region for each of the plurality of image memory regions, further comprising the step of:

reading magnetic information recorded in the magnetic memory regions; and wherein the setting step includes the step of designating a position relationship between each image and each magnetic information when a plurality of images and the magnetic information corresponding to the plurality of images are displayed.

26. The method of claim 18, wherein the setting step includes the step of designating a number of frames of images to be initially displayed.

27. The method of claim 18, wherein the setting step includes the step of designating an area as a display area in at least one of the plurality of designated image memory regions.

28. The method of claim 18, wherein the setting step includes the step of setting a resolution at which a plurality of images corresponding to the image memory regions are to be displayed.

29. The method of claim 18, further comprising the steps of:

setting one of a high speed reading mode and a high quality image reading mode; and controlling image reading based upon the set reading mode.

30. The method of claim 18, wherein the setting step includes setting color separation characteristics of a plurality of the images corresponding to the plurality of designated image memory regions.

31. A storage medium which stores a control process for an image reading apparatus, the image reading apparatus including:

a light source that illuminates a film medium having a plurality of image memory regions;

an image reading sensor that photo-electric converts light from the light source that passes through each of the plurality of image memory regions into an image signal;

a moving mechanism that moves at least one of the film medium and the image reading sensor relative to each other; and a display selector that sets how, from a plurality of possible choices, a plurality of images recorded in the plurality of image memory regions are to be simultaneously displayed, wherein the control process comprises:

a display controlling procedure that processes the image signal based upon the setting of the display selector and that generates display data to simultaneously display the plurality of images on a display screen.

* * * * *